United States Patent
Joronen

(10) Patent No.: US 12,123,137 B2
(45) Date of Patent: Oct. 22, 2024

(54) METHOD AND A SYSTEM FOR PRODUCING AN OIL RICH FRACTION FROM BIOMASS

(71) Applicant: VALMET TECHNOLOGIES OY, Espoo (FI)

(72) Inventor: Tero Joronen, Tampere (FI)

(73) Assignee: VALMET TECHNOLOGIES OY, Espoo (FI)

( * ) Notice: Subject to any disclaimer, the term of this patent is extended or adjusted under 35 U.S.C. 154(b) by 357 days.

(21) Appl. No.: 17/754,850

(22) PCT Filed: Nov. 6, 2020

(86) PCT No.: PCT/FI2020/050735
§ 371 (c)(1),
(2) Date: Apr. 13, 2022

(87) PCT Pub. No.: WO2021/089923
PCT Pub. Date: May 14, 2021

(65) Prior Publication Data
US 2023/0235507 A1 Jul. 27, 2023

(30) Foreign Application Priority Data

Nov. 8, 2019 (FI) .................................... 20195955

(51) Int. Cl.
*D21C 11/00* (2006.01)
*C01D 3/00* (2006.01)
(Continued)

(52) U.S. Cl.
CPC ............ *D21C 11/0007* (2013.01); *C01D 3/00* (2013.01); *C10G 1/002* (2013.01); *C10G 1/045* (2013.01);
(Continued)

(58) Field of Classification Search
CPC .................. D21C 11/0007; D21C 11/0042
See application file for complete search history.

(56) References Cited

U.S. PATENT DOCUMENTS

| 2012/0101319 | A1 | 4/2012 | Roberts et al. |
| 2013/0090487 | A1* | 4/2013 | Bosetti ................ C02F 3/28 554/1 |
| 2016/0208183 | A1 | 7/2016 | Iversen |

FOREIGN PATENT DOCUMENTS

| CA | 3122800 A1 * | 12/2021 | .............. C08H 8/00 |
| CN | 1607296 A | 4/2005 | |

(Continued)

OTHER PUBLICATIONS

EPA, Municipal Solid Waste, Mar. 29, 2016, EPA. (Year: 2016).*
(Continued)

*Primary Examiner* — Anthony Calandra
(74) *Attorney, Agent, or Firm* — Alston & Bird LLP

(57) ABSTRACT

The invention relates to a method for producing an oil rich fraction (OF) from primary feedstock (FS) that comprises water, first salt, second salt, and biomass. The feedstock (FS) is provided to a first reaction zone (Z1) of a conversion reactor (100), where it is allowed to react at a temperature of at least 350° C. in a pressure of at least 160 bar to form converted primary feedstock. The method comprises separating from the converted primary feedstock a first salt rich fraction (SF1), a second salt rich fraction (SF2), and an oil rich fraction (OF). The method comprises withdrawing the oil rich fraction (OF) from the first reaction zone (Z1) and withdrawing the first salt rich fraction (SF1) and the second salt rich fraction (SF2) from the conversion reactor (100). In the method the first salt rich fraction (SF1) comprises at least some of the first salt dissolved in the water, the second salt rich fraction (SF2) comprises at least some of the second salt in solid form, and at least one of the first salt and the second (Continued)

salt is a salt capable of catalysing the reaction of the biomass of the primary feedstock (FS) with the water of the primary feedstock (FS) to produce the oil rich fraction (OF). A device for the same.

19 Claims, 10 Drawing Sheets

(51) Int. Cl.
    *C10G 1/00*      (2006.01)
    *C10G 1/04*      (2006.01)
    *C10G 1/08*      (2006.01)

(52) U.S. Cl.
    CPC .......... *C10G 1/086* (2013.01); *D21C 11/0042* (2013.01); *D21C 11/0071* (2013.01); *D21C 11/0078* (2013.01); *C10G 2300/202* (2013.01); *C10G 2300/4006* (2013.01); *C10G 2300/4012* (2013.01); *C10G 2300/70* (2013.01); *C10G 2300/805* (2013.01)

(56) References Cited

FOREIGN PATENT DOCUMENTS

| | | | |
|---|---|---|---|
| CN | 102199435 A | 9/2011 | |
| CN | 103571527 A | 2/2014 | |
| CN | 204939232 U | 1/2016 | |
| CN | 105523783 A | 4/2016 | |
| EP | 2749626 A1 * | 7/2014 | ............... C02F 11/10 |
| WO | WO-2012/175796 A1 | 12/2012 | |
| WO | WO-2013063085 A1 * | 5/2013 | ............ A61K 8/9722 |
| WO | WO-2017048164 A1 * | 3/2017 | ............... C07G 1/00 |
| WO | WO-2018/115593 A1 | 6/2018 | |

OTHER PUBLICATIONS

Federal Highway Administration, User Guidelines for Waste and Byproduct Material in Pavement Construction, Mar. 8, 2016 (Year: 2016).*

Office Action for Chinese Patent Application No. 202080076848.6, dated Oct. 7, 2023, (13 pages), China National Intellectual Property Administration, Beijing, China.

International Searching Authority, International Search Report and Written Opinion for International Application No. PCT/FI2020/050735, dated Feb. 9, 2021, (9 pages), European Patent Office, Rijswijk, Netherlands.

International Searching Authority, Amended International Search Report and Written Opinion for International Application No. PCT/FI2020/050735, dated Mar. 16, 2021, (10 pages), European Patent Office, Rijswijk, Netherlands.

Finnish Office Action for Patent Application No. 20195955, dated May 4, 2020, (7 pages), Finnish Patent and Registration Office, Helsinki, Finland.

Sricharoenchaikul, V. "Assessment of Black Liquor Gasification in Supercritical Water," Bioresource Technology, Jan. 1, 2009, vol. 100, No. 2, pp. 638-643.

De Blasio, Cataldo et al. "Concerning Operational Aspects in Supercritical Water Gasification of Kraft Black Liquor," Renewable Energy, vol. 130, Jan. 2019, pp. 891-901, DOI: 10.1016/j.renene.2018.07.004.

Voisin, Thomas et al. "Solubility of Inorganic Salts in Sub- and Supercritical, Hydrothermal Environment: Application to SCWO Process," *Journal of Supercritical Fluids*, Elsevier, Mar. 2, 2017, vol. 120, Part 1, pp. 18-31, DOI: 10.1016/j.supflu.2016.09.020. hal-01417006.

Stewart, Maurice et al. "Chapter 4—Three-Phase Oil and Water Separators," *Gas-Liquid and Liquid-Liquid Separators*, (Year: 2008), (45 pages), Elsevier, XP008119676, ISBN: 978-0-7506-8979-3, available online at https://www.academia.edu/32078953/Three-Phase_Oil_and_Water_Separators.

* cited by examiner

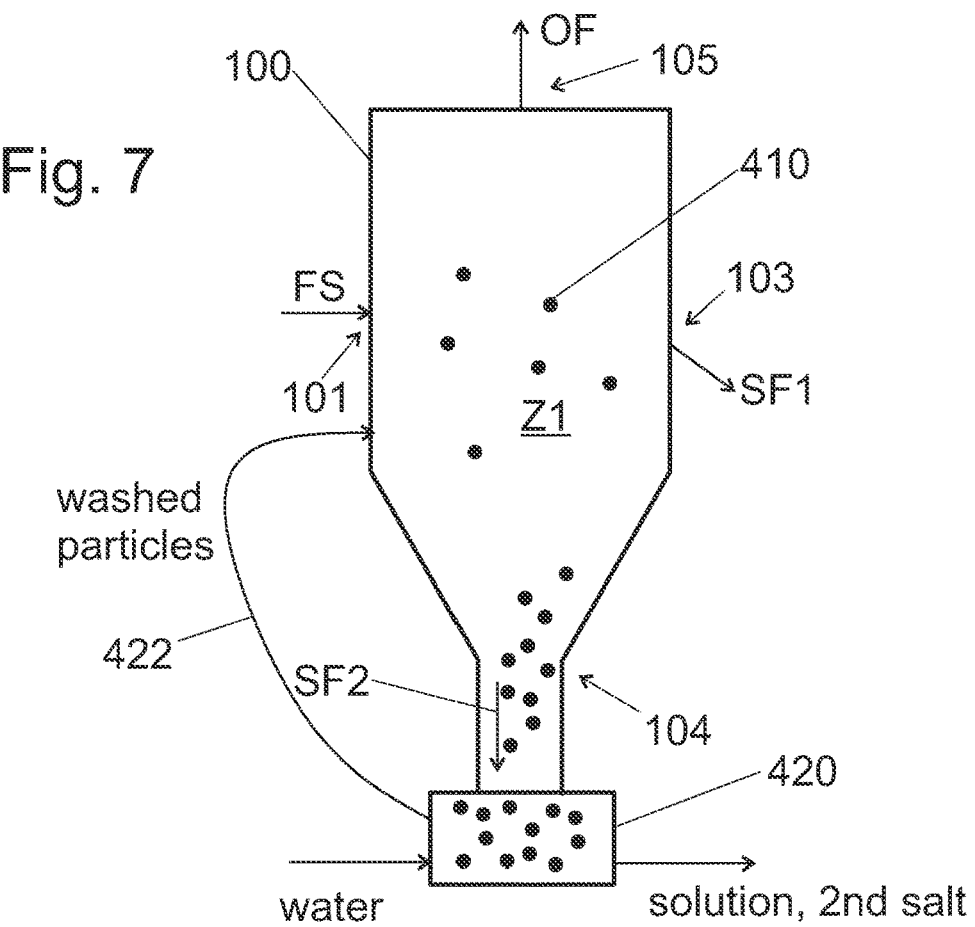
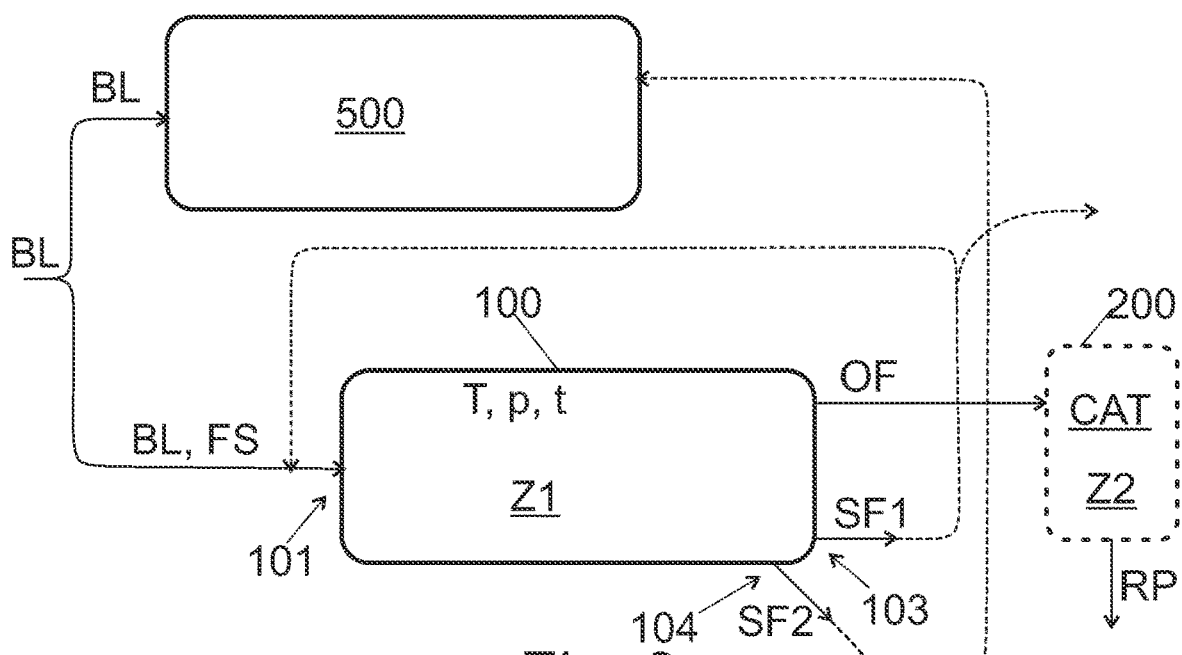

METHOD AND A SYSTEM FOR PRODUCING AN OIL RICH FRACTION FROM BIOMASS

CROSS REFERENCE TO RELATED APPLICATIONS

This application is a National Stage Application, filed under 35 U.S.C. § 371, of International Application No. PCT/FI2020/050735, filed Nov. 6, 2020, which claims priority to Finland Application No. 20195955, filed Nov. 8, 2019; the contents of both of which are hereby incorporated by reference in their entirety.

BACKGROUND

Related Field

The invention relates to methods and devices for producing liquid bio oil. Bio oil can be produced from feedstock comprising biomass. The invention relates to a method and a device for producing bio oil of high quality, the bio oil being widely applicable, e.g. as a substitute for fossil fuel and/or as a feed for biochemical production.

Description of Related Art

Bio based materials have received a lot of interest as a replacement of fossil based materials in fuels and chemical industry. Bio based oil (hereinafter bio oil) can be produced from biomass in processes known per se. Such processes include heat treatment of the biomass, possibly in the presence of water, steam, and/or a catalyst, and collection of the reaction products.

However, oftentimes the quality of the bio oil is not optimal. For example, an oxygen content of the bio oil may be too high. This affects the calorific value and in addition the stability of the bio oil, since the oxygen thereof tends to react during storage. In addition, sometimes a content of impurities, including elements from the groups 1 and 2 of the IUPAC periodic table of elements as well as other metals, are high. This affects the possibilities of refining the bio oil, since such impurities may prevent using catalysts to refine the bio oil. In the biomass, such impurities are oftentimes present in the form a salt or salts.

BRIEF SUMMARY

It has now been found that at supercritical or near supercritical process conditions, salt can be used as a catalyst to catalyse the reaction of biomass and water to produce bio oil. However, as indicated above, the salt would be an impurity of the bio oil. It has also been found that salts do not well dissolve into water in a supercritical or near supercritical condition. Thus, it has been found that salts can be separated from the rest of the feedstock relatively easily at these process conditions. In particular, it has been found that salts of first type, which are largely soluble, can be withdrawn from the process as a first salt rich fraction as a solution, and salts of second type, which are largely insoluble, can be withdrawn from the process in a second salt rich fraction in solid form. Thus, after completion of the conversion reaction of the biomass to the bio oil, the two salt rich fractions can be withdrawn from the process to produce cleaner bio oil. Moreover, withdrawing some of the second salts in solid form has the effect that these salts do not solidify into the reactor. Therefore, blocking of the reactor is prevented. Moreover, recycling salt or salts back to the process for use as a catalyst and/or for recovering materials therefrom becomes feasible. Thus, a process is described, which produces reasonably high quality bio oil [A] in terms of oxygen content, by using salt as a catalyst, and [B] in terms of purity, by removal of salts from the process.

The process is described in more detail in the independent claim 1. The claims dependent on it and the description disclose preferable embodiments. A corresponding system is described in more detail in the independent claim 13. The claims dependent on either of them and the description disclose preferable embodiments.

BRIEF DESCRIPTION OF THE FIGURES

FIG. 7 shows a method for crystallizing salt onto particles, and FIG. 8 shows integration of the method with recovering cooking chemicals in a chemical recovery boiler.

DETAILED DESCRIPTION OF VARIOUS EMBODIMENTS

Figure 1A:
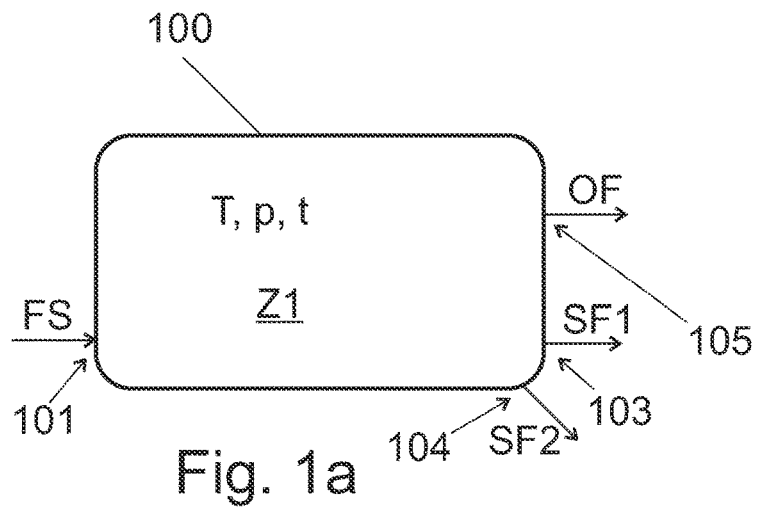
FIG. 1a describes a method for producing an oil rich fraction from biomass.

FIG. 1a describes a method for producing an oil rich fraction from biomass. In the method, primary feedstock FS is provided to a first reaction zone Z1 of a conversion reactor 100. The first reaction zone is a space within the conversion reactor 100, in which conversion of the primary feedstock FS to chemically different compounds takes place. The primary feedstock FS comprises water, salts, and biomass, which terms will be detailed later. At least one of the salts catalyses the conversion of the biomass to hydrocarbons for the bio oil. In this way, the salt acts as a catalyst, and may be referred to as a homogeneous catalyst. The term homogeneous catalyst refers to such catalysts, that at least some of the catalyst is dissolved in the primary feedstock FS. Thus, the catalyst and the primary feedstock FS are in the same phase (liquid and/or vapour and/or supercritical). Since the catalyst is a homogeneous catalyst, the salt that acts as a catalyst may be, in particular, the salt of a first salt rich phase, which will be detailed below.

It has been found that the salt catalyses the conversion reaction at least when the process conditions are supercritical or near supercritical. The term supercritical is used with respect to the critical point of water (i.e. temperature of 374° C. and pressure of 22 MPa, i.e. 220 bar). The conversion reaction is typically reasonably rapid. More specifically, typically a reaction time t of at least 5 minutes is sufficient. Therefore, in the method, the primary feedstock FS is allowed to react in the first reaction zone Z1 at a temperature T of at least 350° C., e.g. from 350° C. to 450° C., and in a pressure p of at least 160 bar. In an embodiment, the primary feedstock FS is allowed to react in this environment for a reaction time t of at least 5 minutes. Having a higher pressure does not prevent the conversion reaction from taking place. However, from point of view of manufacturing suitable conversion reactors 100, preferably the pressure p is from 160 bar to 350 bar. Moreover, having a longer reaction time does not normally worsen the properties of the conversion product, but harmful secondary reactions, for instance, carbonization and repolymerization may occur. However, from point of view of efficient production, too long reaction times should be avoided. Therefore, in an embodiment, the primary feedstock FS is allowed to react in the first reaction zone Z1 at a temperature T of from 350° C. to 450° C. and in a pressure p of from 160 bar to 350 bar for a reaction time t of from 5 minutes to 30 minutes.

As indicated in the background, from the point of view of bio oil quality, the bio oil should not contain a substantial amount of the salts of the primary feedstock FS. It has been bound that in these process conditions, a solubility of the salts into the water of the feedstock is reduced to a significant extent. Therefore, in these process conditions, it is possible to separate a first salt rich fraction SF1, a second salt rich fraction SF2, and the oil rich fraction OF from the primary feedstock FS, i.e. the conversion product of the primary feedstock FS after the conversion. Thus, an embodiment comprises separating, at the temperature of from 350° C. to 450° C. and in the pressure of at least 160 bar, from the converted primary feedstock FS the first salt rich fraction SF1, the second salt rich fraction SF2, and the oil rich fraction OF. The pressure in which the separation is done may be e.g. from 160 bar to 350 bar. The temperature and pressure in which the separation is done may be the same as in the conversion reaction. Removal of both the salt rich fractions SF1 and SF2 improves the quality of the bio oil. In this way, the oil rich fraction OF is produced.

As for the first and second salt rich fractions SF1 and SF2, the first salt rich fraction SF1 comprises first salt dissolved in the water of the feedstock FS, and the second salt rich fraction SF2 comprises second salt in solid form. In general, the first salt may be a salt generally called as type one salt, and the second salt may be a salt generally called as type two salt. The solubility of type two salts decreases as function of increasing temperature near or at supercritical conditions more rapidly than the solubility of type one salts. In general, type one salts present a continuous solubility curve at supercritical temperature which does not cross the critical curve, whereas type two salts present an intersection between the solubility curve and the critical curve, leading to two critical endpoints in this domain. More information on these two different types of salts can be found from reference [1].

Therefore, type two salts tend to crystallize and/or form agglomerates at these process conditions, while type one salts tend to form brine. In this way, type one salts concentrate and type two salts crystallize at these conditions. Typically, type two salts form sticky precipitates that easily adhere on surfaces of the conversion reactor 100 and may cause blocking of the conversion reactor 100. Therefore, removal of the second salt rich fraction SF2 prevents blocking of the conversion reactor 100. Type one salts include NaCl, KCl, $K_2CO_3$, $MgCl_2$, and $CaCl_2$). Type two salts include $MgCO_3$, $MgSO_4$, CaCO3, CaCO4, $Na_2CO_3$, $Na_2SO_4$, $Na_3PO_4$, $KSO_4$ and $SiO_2$. However, these characterizations are applicable to solutions having single salt. In case of salt mixture, complex reactions may occur near supercritical conditions. For example $Na_3PO_4$ and $K_2SO_4$ are normally type two salts, but in a mixture they may form $K_3PO_4$ and $Na_2SO_4$, which are type one and type two salts, respectively.

In an embodiment, the second salt rich fraction SF2 comprises type two salt. By solidifying the type two salt(s) of the second salt rich fraction SF2, the aforementioned blocking problem can be avoided. As the type two salt is solidified and removed from the conversion reactor 100, it does not clog onto inner walls of the conversion reactor 100. Examples of specific means for solidifying the type two salts will be presented later. Preferably most of the salts are withdrawn from the conversion reactor 100 in the salt rich fractions SF1 and SF2. In this way, the oil rich fraction OF comprises only a little (if any) salts. Thus, in an embodiment, at most 5% of the salts (type one and type two salts) fed into the conversion reactor 100 are withdrawn from the conversion reactor 100 with the oil rich fraction OF. Obviously the rest of the salts are withdrawn with the fractions SF1 and SF2.

In particular, type one salts involved in the process, when black liquor is used as the feedstock FS include NaCl, KCl, $MgCl_2$, and $CaCl_2$, and type two salts involved in the process include $MgCO_3$, $MgSO_4$, $CaCO_3$, $CaCO_4$, $Na_2CO_3$, $Na_2SO_4$, and $K_2SO_4$.

In general, the salt rich fractions SF1 and SF2 have a higher density (as measured in $kg/m^3$) than the oil rich fraction OF. Thus, the salt rich fractions SF1 and SF2 may be separated from the converted primary feedstock FS for example by any means that is suitable for separating liquids having different densities. Such methods include centrifugal methods and methods based on gravity. Preferably, the first salt rich fraction SF1 is separated from the converted primary feedstock FS by gravity. Preferably, the second salt rich fraction SF2 is separated from the converted primary feedstock FS by gravity. Thus, the first salt rich fraction SF1 may be withdrawn from a first point of the conversion reactor 100, the first point being at lower vertical level than the point from which the oil rich fraction OF (or a reaction product RP thereof) is withdrawn. In addition or alternatively, the second salt rich fraction SF2 may be withdrawn from a second point of the conversion reactor 100, the second point being at lower vertical level than the point from which the oil rich fraction OF (or a reaction product RP thereof) is withdrawn. Moreover, the second salt rich fraction SF2 may be withdrawn from the second point of the conversion reactor 100, the second point being at a lower vertical level than the first point, from which the first salt rich fraction SF1 is withdrawn.

At least a part of the first salt rich fraction SF1 may be recycled to be used as the catalyst. Thus, an embodiment comprises feeding at least some of the first salt rich fraction SF1 into the first reaction zone Z1 of the conversion reactor 100. Such an embodiment is shown e.g. in FIG. 2. At least a part of the second salt rich fraction SF2 may be recycled to be used as the catalyst. Thus, an embodiment comprises feeding at least some of the second salt rich fraction SF2 into the first reaction zone Z1 of the conversion reactor 100. Such an embodiment is shown e.g. in FIG. 2. When at least some of the salt rich fraction(s) SF1, SF2 is recycled, a heater 130 may be used to heat the corresponding salt rich fraction (see FIG. 2). Moreover, the heater 130 may be used to heat the recycled salt rich fraction close to a supercritical temperature.

Figure 1B:
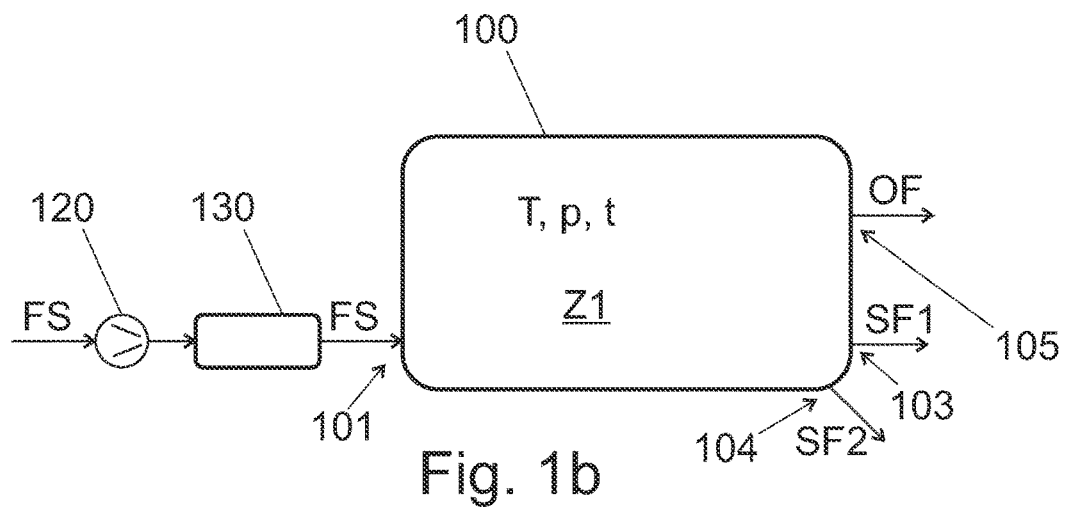
FIG. 1b describes a method for producing an oil rich fraction from biomass, wherein feedstock is heated, FIG. 1c describes a method for producing liquid bio oil by cooling an oil rich fraction, FIGS. 1d and 1e describe methods for producing liquid bio oil, wherein the feedstock is heated, FIG. 2 describes a method for producing liquid bio oil, wherein the feedstock is formed by mixing different components thereof, and the components may include dissolved and/or solid salt, FIGS. 3a to 3d describe methods for producing liquid bio oil, wherein an oil rich fraction is catalytically converted to a reaction product, FIG. 3e describes a method, wherein an oil rich fraction is catalytically converted to a reaction product, FIGS. 4a to 4c describe methods for producing liquid bio oil and refining the bio oil thus produced, FIGS. 5a to 5f describe methods for producing liquid bio oil and recovering and using heat in the process, FIGS. 6a to 6c describe use of a crystallizer to form salt in crystal form, which may be removed as part of a second salt rich fraction.

As indicated above, in such a case, the type two salts may solidify, whereby they may clog the heater 130. Therefore an embodiment comprises recycling at least some of the first salt rich fraction SF1. This embodiment may comprise heating the recycled first salt rich fraction SF1 in a heater 130. However, the heater 130 needs not heat the recycled salt rich fraction(s), as indicated in FIGS. 1b, 1d and 1e.

Referring to FIG. 8, in particular, when the feedstock FS comprises black liquor BL, the salt(s) of the salt rich fraction(s) SF1 and/or SF2 may be fed to a chemical recovery boiler 500 in order to recover cooking chemicals from these salts. The chemical recovery boiler 500 can be seen as a part of a chemical recovery cycle configured to recover cooking chemicals. Thus, in an embodiment, the primary feedstock FS comprises black liquor BL and the method comprises feeding at least some of the first salt rich fraction SF1 into a chemical recovery cycle configured to recover cooking chemicals, e.g. into a chemical recovery boiler 500 that is configured to burn black liquor. Moreover, in an embodiment, the primary feedstock FS comprises black liquor BL and the method comprises feeding at least some of the second salt rich fraction SF2 into a chemical recovery cycle configured to recover cooking chemicals, e.g. into a chemical recovery boiler 500 that is configured to burn black liquor. Such an embodiment is shown in FIG. 8. Even if FIG. 8 shows that only the second salt rich fraction SF2 is fed to the recovery boiler 500, both salt rich fractions SF1 and SF2 may be fed to the recovery boiler 500, and neither the first fraction SF1 nor the second fraction SF2 needs be fed to the recovery boiler 500. It is noted that when the feedstock FS comprises black liquor, typically the cooking chemicals are type two salts. Therefore, in such an embodiment, preferably at least some of the second salt rich fraction SF2 is fed into a chemical recovery boiler 500 that is configured to burn black liquor.

Moreover, as readable from the above, type one salts include salts comprising chlorine (Cl) and salts comprising potassium (K). When applying the process in combination with a chemical recovery boiler 500, such salts are preferably not recovered in the boiler 500, since the cooking phase of the Kraft process does not need such cooking chemicals. In contrast, most of the cooking chemicals to be recovered are in form of type two salts. Moreover the chlorine may pose corrosion problems to the equipment. Thus, in such context, it is beneficial to feed only the type two salts (i.e. second salt rich fraction SF2) to a chemical recovery cycle configured to recover cooking chemicals, such as to a chemical recovery boiler 500, and use the type one salts (i.e. first salt rich fraction SF1) otherwise, e.g. by feeding at least part of them back to the process to be used as catalyst for the biomass conversion, as shown in FIG. 8.

Even if not shown in the Figures, at least part of the first salt rich fraction SF1 and/or at least part of the second salt rich fraction SF2 may be fed to the first process zone Z1 (see FIG. 2), even if at least a part of the second salt rich fraction SF2 is fed to a chemical recovery boiler 500 (FIG. 8).

Moreover, when black liquor BL is used as the feedstock FS, part of the same black liquor may be burned in the recovery boiler 500. Thus, an embodiment comprises receiving black liquor, dividing the black liquor into a first part (arrow "BL, FS" in FIG. 8) and a second part (upper BL arrow in FIG. 8), conveying the first part into the conversion reactor 100, and conveying the second part into the chemical recovery boiler 500.

Referring back to FIGS. 1a to 1e, the oil rich fraction OF is withdrawn from the first reaction zone Z1. As will be detailed below, the oil rich fraction OF may be further reacted within a second reaction zone Z2 located in the same conversion reactor 100. The oil rich fraction OF may be withdrawn from the conversion reactor 100. As will be detailed below, the oil rich fraction OF may be further reacted within a second reaction zone Z2 located in another reactor 200. The first salt rich fraction SF1 is withdrawn from the conversion reactor 100. The second salt rich fraction SF2 is withdrawn from the conversion reactor 100. In this way on oil rich fraction OF can be produced, as depicted in FIGS. 1a and 1b.

Figure 3A:
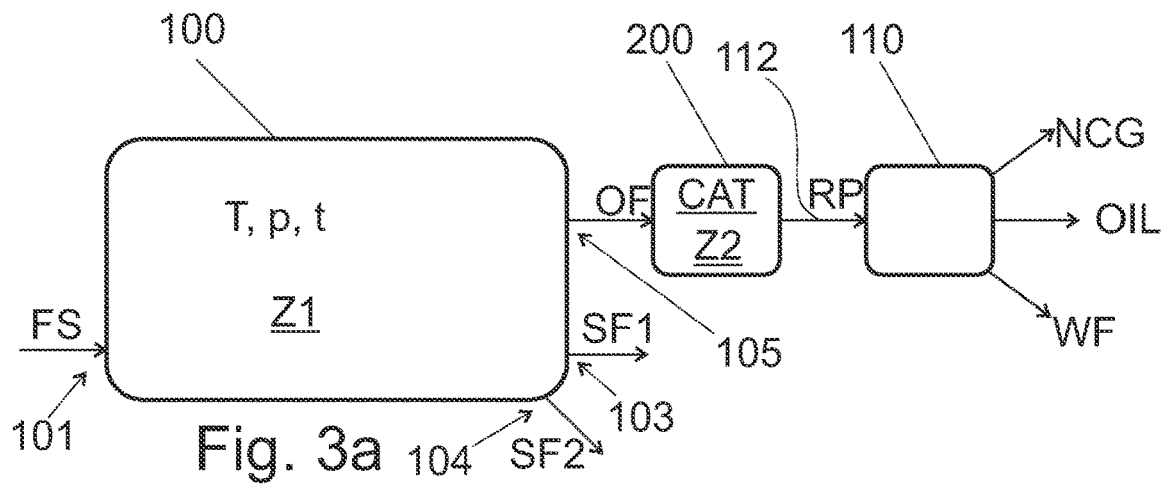

In an embodiment, the oil rich fraction OF is cooled to produce liquid bio oil, denoted by "OIL" in the Figures (except 1a, 1b, and 3e). By cooling, at least a part of the bio oil of the oil rich fraction OF condenses to liquid form. In an embodiment, the oil rich fraction OF is cooled (and condensed) to produce the liquid bio oil, denoted by "OIL" e.g. in the FIGS. 1c to 1e without the oil rich fraction being transformed (by a chemical reaction) to a reaction product RP before said cooling. In an embodiment, the oil rich fraction OF is first transformed (by a chemical reaction) to a reaction product RP, which is cooled (and condensed) to produce the liquid bio oil, denoted by "OIL" in the FIGS. 3a to 3d. In this way, an embodiment of the method comprises cooling the oil rich fraction OF or a reaction product RP of the oil rich fraction OF to produce the liquid bio oil OIL. It is also possible to not transform a part of the oil rich fraction OF and to transform a part of the oil rich fraction OF to the reaction product RP and condense both the oil rich fraction OF and the reaction product RP. The reaction product RP need not be cooled, as depicted in FIG. 3e. The reaction product RP may cooled, as depicted in FIGS. 3a to 3d.

Figure 5A:
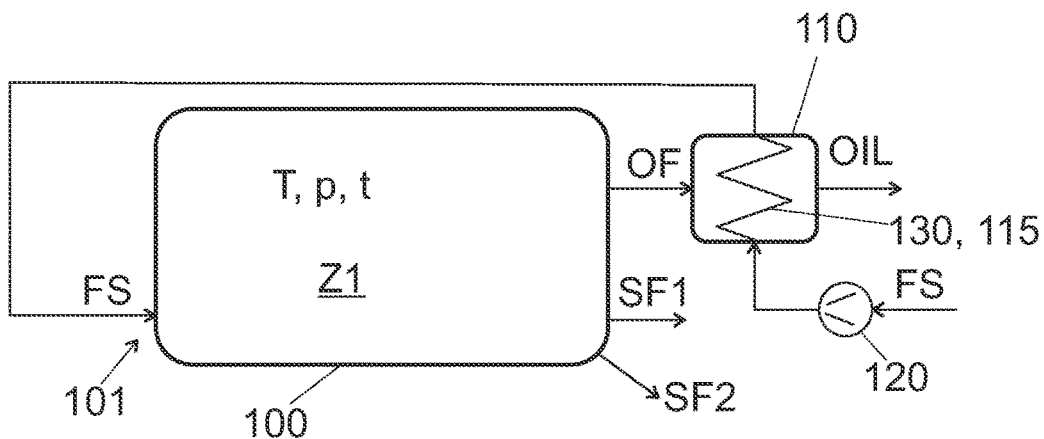
Figure 5B:
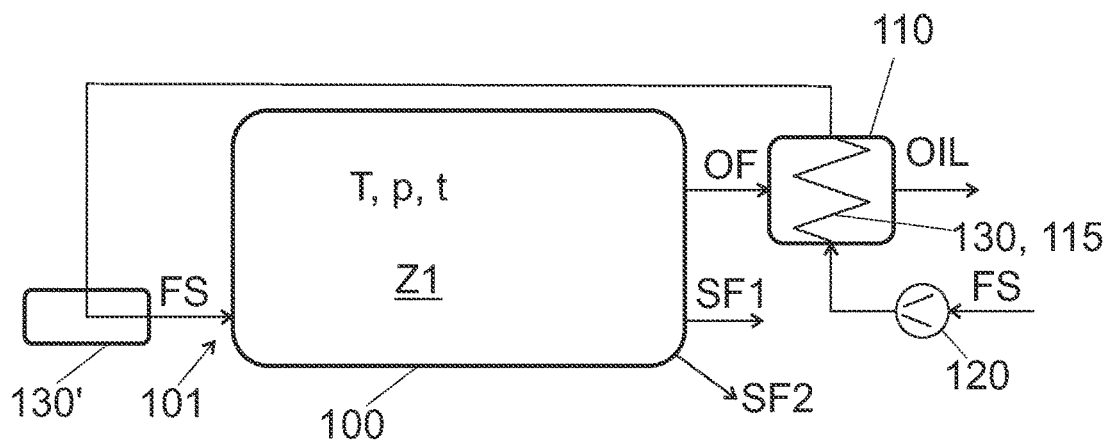
Figure 5C:
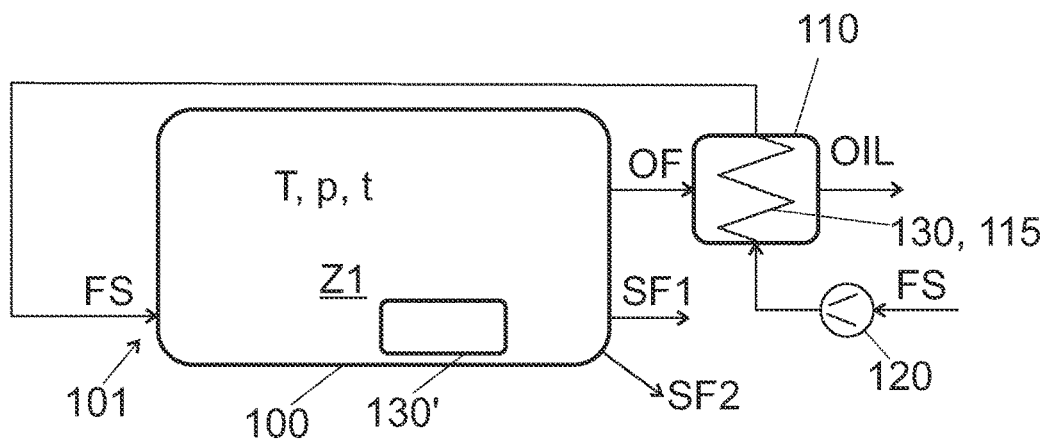

Since the temperature and pressure in the first reaction zone Z1 are reasonably high, the primary feedstock FS may be heated. Referring to FIGS. 1b, 1d and 1e, a heater 130 may be used to heat the primary feedstock FS. The heater 130 may be arranged before the conversion reactor 100, as in FIGS. 1b and 1d, and/or a heater 130 may be arranged inside the conversion reactor 100, as in FIG. 1e. Moreover, even if not shown, the heater 130 may heat the conversion reactor 100 in order to heat the primary feedstock FS therein. Preferably, the heater 130 comprises a heat exchanger 115 configured to transfer heat from at least one of the oil rich fraction OF and the reaction product RP to the primary feedstock FS (see FIGS. 5a to 5f). In such an embodiment, the system may comprise a second heater 130'. The second heater 130' may be used to heat the primary feedstock FS. The second heater 130' may be arranged before the conversion reactor 100 (FIG. 5b), or the second heater 130 may be arrange inside the conversion reactor 100 (FIG. 5c). Moreover, even if not shown, the second heater 130' may heat the conversion reactor 100 in order to heat the primary feedstock therein. In order to feed the primary feedstock FS into the conversion reactor 100, i.e. to a high pressure, a pump 120 is provided (see FIGS. 1b, 1d, and 1e and 5a to 5f).

The heater 130 (and/or the second heater 130') may be configured to heat the primary feedstock FS with a rate of at least 50° C./min, preferably at least 75° C./min.

With reference to FIGS. 1a to 1e, a system for producing oil rich fraction (OF) from biomass comprises the conversion reactor 100. As indicated above, the conversion reactor 100 is configured to allow a primary feedstock FS to react in a first reaction zone Z1 at a temperature of at least 350° C., such as from 350° C. to 450° C., in a pressure of at least 160 bar. Because of the high pressure and temperature, this implies restrictions for the materials and their thicknesses of the conversion reactor 100. The conversion reactor 100 comprises a first inlet 101 for letting in the primary feedstock FS into the first reaction zone Z1, a first outlet 103 for letting out the first salt rich fraction SF1 from the conversion reactor 100, a second outlet 104 for letting out the second salt rich fraction SF2 from the conversion reactor 100, and a third outlet 105 for letting out at least one of the oil rich fraction OF and a reaction product RP of the oil rich fraction OF from the conversion reactor 100. For example, in the embodiments of FIGS. 1c to 1e and 3a and 3b, the third outlet 105 is for letting out the oil rich fraction OF from the conversion reactor 100. For example, in the embodiments of FIGS. 3c and 3d, the third outlet 105 for letting out a reaction product RP of the oil rich fraction OF from the conversion reactor 100.

Moreover, the conversion reactor 100 is configured to separate the first and second salt rich fractions SF1 and SF2 and the oil rich fraction OF from the converted primary feedstock FS at the temperature of at least 350° C., such as from 350° C. to 450° C., and in the pressure of at least 160 bar. For example, the conversion reactor 100 may comprise a centrifuge (not shown) configured to separate at least one of the salt rich fractions SF1 and SF2 and the oil rich fraction OF from the converted primary feedstock FS. For example, a first centrifuge may separate two fractions: [a] a fraction comprising the first and the second salt rich fractions SF1 and SF2 and [b] the oil rich fraction. Thereafter, another centrifuge may be configured to separate the salt rich fractions SF1 and SF2 from each other. Preferably, the conversion reactor 100 is configured to separate the salt rich fractions SF1 and SF2 and the oil rich fraction OF from the converted primary feedstock FS by gravity. In such an embodiment, the first outlet 103 is arranged at a lower vertical level than the third outlet 105 and the second outlet 104 are arranged at a lower vertical level than the third outlet 105. Moreover, the second outlet 104 may be arranged at a lower vertical level than the first outlet 103.

In addition, the system comprises a pump 120 configured to pump the primary feedstock FS through the first inlet 101 into the first reaction zone Z1 having the pressure of at least 160 bar. Since the pressure is reasonably high, the pump 120 must be selected accordingly. When higher pressures are used, or at least can be used, the pump 120 is configured to pump the primary feedstock FS through the first inlet 101 to the a first reaction zone Z1 having the pressure of at least 220 bar or at least 300 bar or 350 bar.

In addition, the system comprises a heater 130 configured to heat the primary feedstock FS and/or the conversion reactor 100 such that a temperature in the first reaction zone Z1 is at least 350° C., such as from 350° C. to 450° C. In an embodiment, the heater 130 is configured to heat the primary feedstock FS to a temperature 350° C., such as 350° C. to 450° C. Preferably, the system comprises a heater 130 configured to heat the primary feedstock FS and/or the conversion reactor 100 such that a temperature in the first reaction zone Z1 is from 375° C. to 450° C. More preferably, the heater 130 is configured to heat the primary feedstock FS to a temperature 375° C. to 450° C.

Figure 1C:
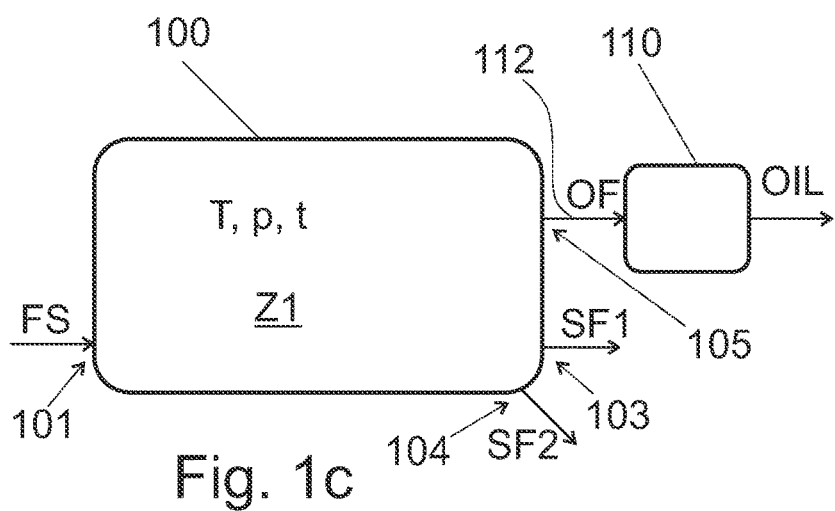
Figure 1D:
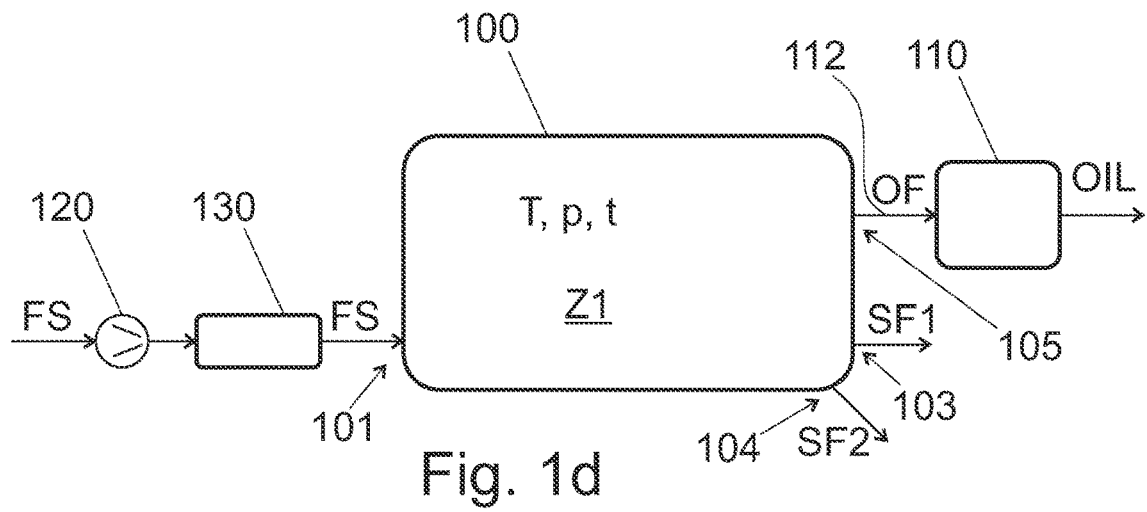
Figure 1E:
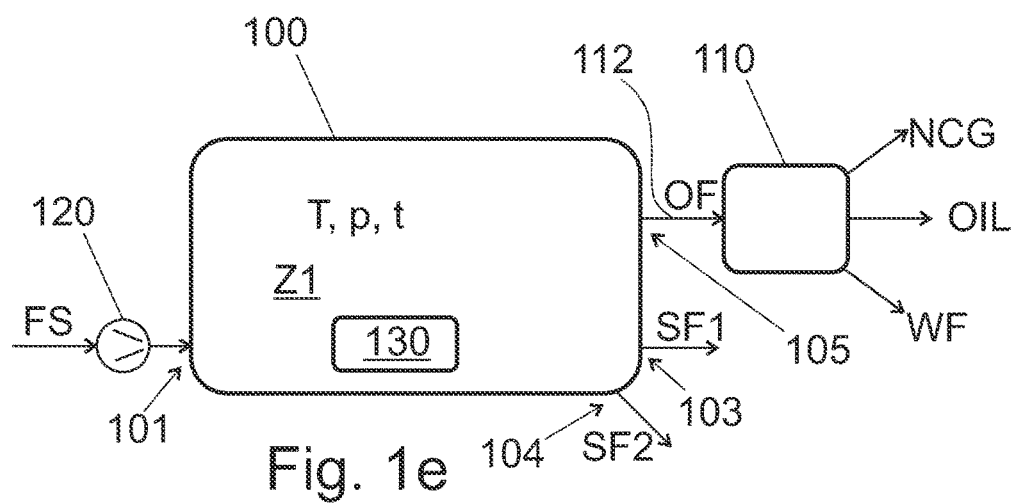

Furthermore, referring to FIGS. 1c to 1e, an embodiment of the system comprises the cooler 110 configured to cool at least one of the oil rich fraction OF and the reaction product RP of the oil rich fraction OF to produce the liquid bio oil OIL. In addition, the system comprises a pipeline 112 for conveying at least one of the oil rich fraction OF and the reaction product RP to the cooler 110. In such a case the system is for producing liquid bio oil ("OIL"). However, as indicated in FIGS. 1a and 1b, the system needs not comprise the cooler 110, in particular when the system is for producing oil rich fraction ("OF").

For example, in the embodiments of FIGS. 1c to 1e the pipeline 112 is configured to convey the oil rich fraction OF from the conversion reactor 100 to the cooler 110. For example, in the embodiments of FIGS. 3c and 3d the pipeline 112 is configured to convey the reaction product RP from the conversion reactor 100 to the cooler 110. For example, in the embodiments of FIGS. 3a and 3b the pipeline 112 is configured to convey the reaction product RP from the catalytic reactor 200 to the cooler 110.

As indicated above, the primary feedstock FS comprises water, salts, and biomass. The term biomass covers materials that naturally comprise also some water. Thus, the water of the primary feedstock FS needs not be added water. However, oftentimes some water is added.

The term "water" may refer also to steam. A water content of the primary feedstock may be at least 25 wt %. This has been found to be a sufficient content for the conversion reaction of the first reaction zone Z1. Thus, in an embodiment, a dry matter content of the primary feedstock FS is at most 75 wt %. A dry matter content of the primary feedstock FS may be from 20 wt % to 75 wt %, preferably from 30 wt % to 70 wt %.

The term "biomass" refers to material(s) of biological origin. Biomass may comprise virgin and waste materials of plant, animal and/or fish origin or microbiological origin, such as virgin wood, wood residues, forest residues, waste, municipal waste, industrial waste or by-products, agricultural waste or by-products, residues or by-products of the wood-processing industry, waste or by-products of the food industry, solid or semi-solid organic residues of anaerobic or aerobic digestion, such as residues from bio-gas production from lignocellulosic and/or municipal waste material, residues from bio-ethanol production process, and any combinations thereof. Suitably said biomass comprises waste and by-products of the wood-processing industry such as slash, urban wood waste, lumber waste, wood chips, wood waste, sawdust, straw, firewood, wood materials, paper, by-products of the papermaking or timber processes, where the biomass (plant biomass) is composed of at least hemicellulose and lignin. The biomass may further comprise cellulose; however, cellulose fibres of wood may have been removed for other purposes, and the remaining biomass may constitute the biomass of the primary feedstock.

The method is particularly suitable when a by-product, or by-products, of pulp or paper making industry, including black liquor of the Kraft process and brown liquor of the sulphite process, are used as the primary feedstock FS, since these by-products naturally comprise a lot of salts and also biomass, including lignin residues and hemicellulose. The salts act as catalysts when converting the feedstock to bio oil. Typically, a dry matter content of such liquors is from 30 wt % to 40 wt %. In this way, in an embodiment, the biomass comprises at least one of lignin and hemicellulose. In an embodiment, the biomass comprises at least one of lignin and hemicellulose and a dry matter content of the primary feedstock FS is from 30 wt % to 40 wt %. Such by-products also comprise only a little cellulose. Thus, in an embodiment, the biomass comprises at least one of lignin and hemicellulose and comprises at most 10 wt % cellulose fibres on dry basis. In an embodiment, the biomass comprises at least one of lignin and hemicellulose and comprises at most 10 wt % cellulose fibres on dry basis, and a dry matter content of the primary feedstock FS is from 30 wt % to 40 wt %. As indicated above, because the salts are removed from the conversion reactor 100, it now has become possible to use also such a highly salt containing material as a feedstock for bio oil production and/or to use salts as catalysts for the conversion. Moreover, in such an embodiment, at least one of the salt rich fractions may be fed to a chemical recovery boiler 500 for recovering cooking chemicals from a salt rich fraction, as indicate above.

More precisely, hereinabove, the term "black liquor" refers to the by-product from the Kraft process when digesting pulpwood into paper pulp by removing lignin, hemicelluloses and other extractives from the wood to free the cellulose fibers. Typically black liquor comprises from 30 wt % to 40 wt % carbon, as measured on dry basis. Therefore, black liquor is suitable as a feedstock material for liquid bio oil.

However, typically black liquor comprises 32 wt % to 38 wt % oxygen (dry basis). Therefore, the oil rich fraction OF obtainable by the catalytic conversion may comprise a significant amount of oxygen. However, as indicated above, oxygen may impart the quality of the bio oil. Thus, when black liquor is used as the feedstock FS or as part of the feedstock FS, preferably, the oil rich fraction OF is further reacted in the second process zone Z2, as discussed above and indicated in FIG. 8. The catalytic reactor 200 having the second zone Z2 is depicted with a dotted line to indicate the it is used only if needed in view of bio oil quality.

Typically biomass in general comprises a reasonable amount of oxygen. In general, this may end up as the oxygen of the bio oil OIL. The degree of how much oxygen ends up in the bio oil may depend on the salt of the primary feedstock FS. However, the salt has the proper functionality at least when an oxygen content of the biomass of the feedstock is sufficiently high. Therefore, in an embodiment, an oxygen content of the biomass is from 30 wt % to 43 wt %. Herein the oxygen content refers to the oxygen content of the dry biomass. Correspondingly, in an embodiment, an oxygen content of dry primary feedstock is from 30 wt % to 43 wt %. The term dry primary feedstock refers to a material obtainable from the primary feedstock FS by drying.

Because of the oxygen, the oil rich fraction OF may comprise oxygen. For example, in an embodiment, the oil rich fraction OF comprises less than 20 wt % oxygen, such as at most 15 wt % oxygen, such as from 5 wt % to 15 wt % oxygen. The oxygen content of the oil rich fraction OF may even be less than 10 wt %, such as from 5 wt % to 10 wt %. In case the oil rich fraction OF is not further reacted in the second process zone Z2, the bio oil may comprise oxygen substantially the same amount. In case the oil rich fraction OF is further reacted in the second process zone Z2, the bio oil may comprise significantly less oxygen. In an embodiment an oxygen content of the bio oil is at most 10 wt %, preferably at most 5 wt %.

The term "salt" (of the primary feedstock) refers to a chemical compound consisting of an assembly of cations and anions. Salts are composed of related numbers of cations (positively charged ions) and anions (negative ions) so that the product is electrically neutral (without a net charge). As indicated above, the primary feedstock FS comprises first salt and second salt. In the primary feedstock, at least a part of the salts may be dissolved in the water of the primary feedstock. In particular, in an embodiment, at least one of the first salt and the second salt is a salt capable of catalysing the reaction of biomass with water to produce bio oil to. More preferably, the first salt is a salt capable of catalysing the reaction of biomass with water to produce bio oil to.

It seems that metals with a negative electronegativity catalyse the conversion reaction. Moreover, it seems that the more electronegative the metal, the better it functions as the catalyst. Therefore, in a preferable embodiment at least one of the salts of the primary feedstock FS is a salt of a metal having a standard electrode potential at the temperature 298 K of at most $-0.5$ V. As indicated above, this salt is collected from the process as part of the first salt rich fraction SF1 or as part of the second salt rich fraction SF2. Therefore, in the invention at least one of the first salt and the second salt is a salt of a metal having a standard electrode potential at the temperature 298 K of at most $-0.5$ V. Examples of such metals are: lithium (Li), potassium (K), calcium (Ca), sodium (Na), magnesium (Mg), aluminium (Al), zinc (Zn), and chromium (Cr). In a more preferable embodiment, at least one of the first salt and the second salt is a salt of a metal having a standard electrode potential at the temperature 298 K of at most $-1.5$ V. Examples of such metals are: lithium (Li), potassium (K), calcium (Ca), sodium (Na), magnesium (Mg), and aluminium (Al).

Even more preferably, the first salt is a salt of a metal having a standard electrode potential at the temperature 298 K of at most $-1.5$ V. This facilitates recycling of (at least a part of) the first salt back to the first process zone Z1 to be re-used as a catalyst. Recycling first salt is preferred over recycling the second salt, since the second salt might block the conversion reactor 100. However, the first salt need not be returned to the conversion reactor 100. As indicated below, the first salt may be type one salt, which forms brine. Typical first salts include chlorides of sodium (NaCl) or potassium (KCl); and the first salt is comprised in a first salt rich fraction SF1. It may be feasible to control the salt content of the first salt rich fraction SF1 in such a manner that recycling is not needed. For example, in case the first salt rich fraction SF1 is withdrawn only when the salt content thereof is sufficiently high, this implies that the salt content within the conversion reactor 100 is also high, whereby recycling is not needed. Recycling is not needed, since the content of catalysts (i.e. salt) is sufficient in the first process zone Z1. However, if first salt rich fraction SF1 has a low salt content, it may be recycled back to the first process zone Z1 to increase the amount of catalysts therein.

In an embodiment, the primary feedstock FS comprises at least one of the following salts:
  a salt of sodium; such as NaOH, $Na_2CO_3$, $NaHCO_3$, $Na_2S$, $Na_2SO_3$, $Na_2S_2O_3$ or $Na_2SO_4$;
  a salt of potassium, such as KOH or $K_2CO_3$; and
  a hydroxide, a carbonate, a bicarbonate, a sulphide, a sulphite, a thiosulphate, and a sulphate of a metal having a standard electrode potential at the temperature 298 K of at most $-0.5$ V.

In a preferable embodiment, the primary feedstock FS comprises at least one of NaOH, $Na_2CO_3$, $NaHCO_3$, KOH, $K_2CO_3$, $KHCO_3$.

In an embodiment, a total content of salt(s) of the primary feedstock FS is at least 0.2 wt %, preferably from 0.2 wt % to 40 wt %. Preferably, a total content of salt(s) of the dry primary feedstock FS is at least 0.5 wt % (dry basis), preferably from 0.5 wt % to 60 wt % as measured on dry basis (i.e. from the dry matter of the primary feedstock FS). More preferably, the primary feedstock FS comprises at least 0.1 wt % ions of sodium or potassium. Even more preferably, the dry matter of the primary feedstock (FS) comprises at least 0.5 wt % (dry basis) sodium and/or potassium.

A feedstock comprising biomass may be a feedstock that can be converted as such following the principles indicated above. The feedstock, e.g. black liquor, may—as such— serve as the primary feedstock. In this way, salt (or water) needs not be added to the primary feedstock FS. In case of liquors, e.g. black liquor, some water may be removed by evaporation to obtain condensed black liquor. The condensed black liquor may serve as the primary feedstock FS.

Figure 2:
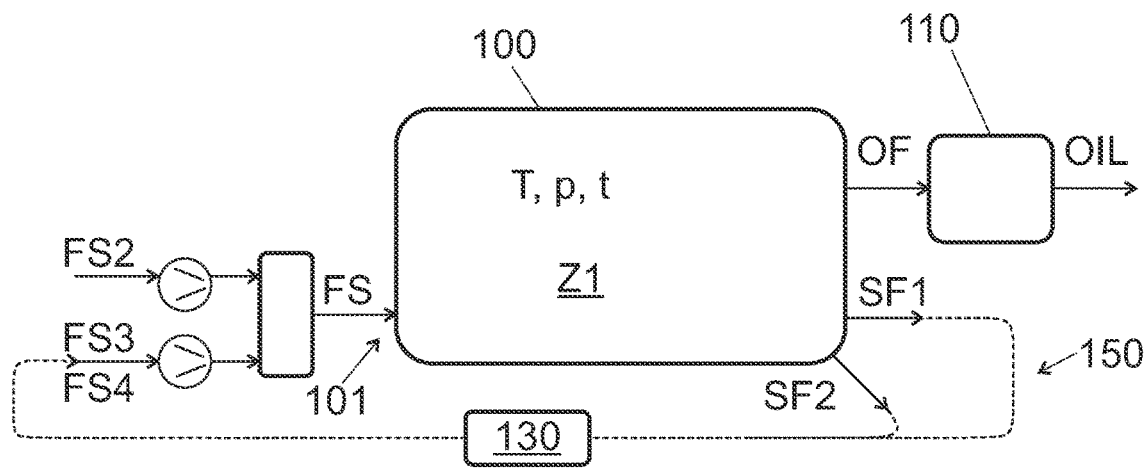

However, some feedstocks do not necessarily comprise sufficiently salt and/or water. Therefore at least one of these may be added. Moreover, as an alternative to salt, some make-up catalyst can be added to the feedstock stream. Referring to FIG. 2 an embodiment comprises receiving secondary feedstock FS2. The secondary feedstock FS2 may be e.g. substantially free from salts. Since the conversion reaction in the first reaction zone Z1 would, in such a case, be inefficient for the secondary feedstock FS2 as such, the embodiment comprises adding at least one of salt FS3 and make-up catalyst FS4 to the secondary feedstock FS2 to produce the primary feedstock FS. Thereafter, the primary feedstock FS can be processed as detailed above. In the alternative or in addition, water can be added to the secondary feedstock FS2, if needed. Suitable dry matter contents for the primary feedstock FS are detailed above. The salt FS3 may be recycled from the conversion reactor 100; and it may comprise at least a part of at one of the first salt rich fraction SF1 and the second salt rich fraction SF2.

Because of the withdrawal of the salt rich fractions SF1 and SF2, a salt content of the bio oil OIL is less than a salt content of the primary feedstock FS. Moreover, preferably, the salt comprises at least one of sodium and potassium. Therefore, in an embodiment, the primary feedstock FS contains at least one of sodium and potassium and the primary feedstock FS has a first content of sodium and potassium. Herein the first content refers to the total content of sodium and potassium as measured in wt %. Moreover, the liquid bio oil OIL has a second content of sodium and potassium. Also here the second content refers to the total content of sodium and potassium as measured in wt %. Because of the removal of the salt rich fraction SF, the second content is less than the first content. The second content may be less than the first content e.g. by at least 1 percentage unit, wherein the first and second contents are measured in wt %.

By cooling at least one of the oil rich fraction OF and the reaction product RP thereof, at least a part of at least one of the oil rich fraction OF and the reaction product RP thereof, respectively, is condensed. Moreover, the term liquid bio oil refers to oil that is in a liquid state in a temperature of from 5° C. to 95° C. in atmospheric pressure. Thus, an embodiment comprises cooling the oil rich fraction OF or the reaction product RP thereof to a temperature from 5° C. to 90° C. to produce liquid (i.e. condensed) bio oil OIL.

All the compounds of the oil rich fraction OF or the reaction product RP thereof need not condense in such a temperature. Such compounds may include carbon monoxide or carbon dioxide. Compounds that do not condense in the aforementioned temperatures may be removed as non-condensable gases. Moreover, water (i.e. a water rich fraction) can be separated from the condensate of the oil rich fraction OF or the reaction product RP to obtain the bio oil OIL. Therefore, an embodiment comprises separating at least one of non-condensable gases (NCG) and a water rich fraction (WF) from the condensate of the oil rich fraction OF or the reaction product RP thereof to produce the liquid bio oil OIL (FIGS. 1e and 3a). Even if such separation is only shown in the contexts of FIGS. 1e and 3a, such separation may be applied within the context of any embodiment comprising cooling, in particular in the context of any figure except 1a, 1b, and 3e. Herein the term non-condensable gas refers to a substance of which boiling point at the atmospheric pressure is at most zero degrees Celsius. Thus, an embodiment comprises separating at least one
- a gas, of which boiling point at the atmospheric pressure is at most 0° C. and
- a water rich fraction (WF)

from the condensate of the oil rich fraction (OF) or the reaction product (RP) thereof to produce the liquid bio oil (OIL).

An embodiment comprises decreasing a pressure of one of (i) the oil rich fraction OF, (ii) the reaction product RP of the oil rich fraction OF, and (iii) the bio oil OIL to 0.5 bar(a) to 2.0 bar(a). Herein the unit bar(a) refers to absolute pressure. An embodiment comprises decreasing a pressure of one of the oil rich fraction OF, the reaction product RP of the oil rich fraction OF, and the bio oil OIL to atmospheric pressure. An embodiment comprises letting out liquid bio oil at a temperature of from 5° C. to 95° C. in a pressure of 0.5 bar(a) to 2.0 bar(a). An embodiment comprises letting out liquid bio oil at a temperature of from 50° C. to 95° C. in atmospheric pressure.

It has been found that the oxygen content of the bio oil can be affected at least by the following:
(a) the type of salt used to catalyse the conversion process,
(b) the reaction temperature of the conversion process,
(c) the residence time of the reaction, i.e. the reaction time t and
(d) use of a solid catalyst to transform the oil rich fraction OF to a reaction product RP of the rich fraction OF.

As for (a), the effect of salt has been discussed above.

As for (b), preferably the reaction temperature T in the first reaction zone Z1 is from 375° C. to 450° C. and the pressure p is from 220 bar to 350 bar.

As for (c), the reaction time has been discussed above, preferably the reaction time is from 5 min to 30 min.

As for (d), with reference to FIGS. 3a to 3d, the oil rich fraction OF can be catalytically treated (i.e. transformed) to form a reaction product RP. The reaction product RP may thereafter be cooled, if needed, to produce bio oil OIL. For these reasons, and with reference to FIGS. 3a to 3d, an embodiment comprises feeding the oil rich fraction OF to a second reaction zone Z2 and allowing the oil rich fraction to OF react in the presence of a solid catalyst CAT in the second reaction zone Z2 to produce the reaction product RP of the rich fraction OF. The solid catalyst CAT is also a heterogeneous catalyst; meaning that the phase of the catalyst (solid) differs from the phase of the primary feedstock FS (liquid, gaseous, or supercritical).

In these embodiments, the solid catalyst CAT has at least a deoxygenating functionality. The catalyst CAT is a solid catalyst in the sense that it is insoluble to the oil rich fraction OF. The solid catalyst CAT may be a supported catalyst. The solid catalyst CAT may form a bed of catalyst material, through which the oil rich fraction OF is conveyed.

A corresponding system comprises solid catalyst material CAT in a second process zone Z2. The second process zone Z2 may be arranged in the conversion reactor 100 or in a catalytic reactor 200. The solid catalyst CAT is configured to transform the oil rich fraction OF to a reaction product RP. In an embodiment, the solid catalyst CAT is configured to transform the oil rich fraction OF to a reaction product RP by deoxygenating at least some compounds of the oil rich fraction OF.

A purpose of the solid catalyst CAT is to deoxygenate oxygenated hydrocarbons of the oil rich fraction OF. In deoxygenation, deoxygenation reactions deoxygenate at least some of the oxygenated hydrocarbons to hydrocarbons, or at least less oxygenated hydrocarbons. In the reaction, at least some of the oxygen (O) that is bound to oxygenated hydrocarbons is removed from the oxygenated hydrocarbons thereby deoxygenating these hydrocarbons. Depending on the solid catalyst CAT, hydrogen may be added, but needs not always to be added to the second reaction zone Z2. The removed oxygen forms with other constituents of the oil rich fraction OF other oxygen containing compounds, such as water $H_2O$, carbon monoxide CO, and/or carbon dioxide $CO_2$. Also, some light hydrocarbons and oxygenated hydrocarbons may be formed as a result of the reactions. These compounds may be removed from the reaction product RP or the bio oil OIL e.g. during condensation.

As indicated in FIGS. 3a to 3d, these embodiments comprise condensing a reaction product RP of the oil rich fraction OF to produce the liquid bio oil OIL. As indicated in FIG. 3e, the reaction product RP of the oil rich fraction OF need not be cooled.

FIG. 3a shows an embodiment, wherein such a solid catalyst CAT is used that addition of hydrogen is not necessary. Moreover, a catalytic reactor 200, which is separate from the conversion reactor 100 is used for catalytically treating the oil rich fraction OF. Correspondingly, the oil rich fraction is conveyed from the conversion reactor 100 to the catalytic reactor 200.

Figure 3B:
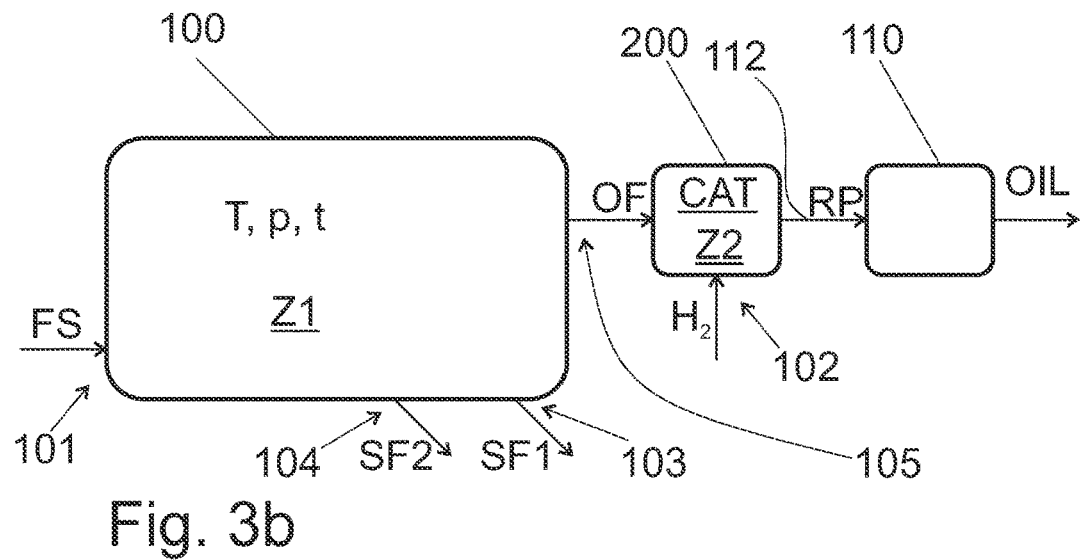
Figure 3E:
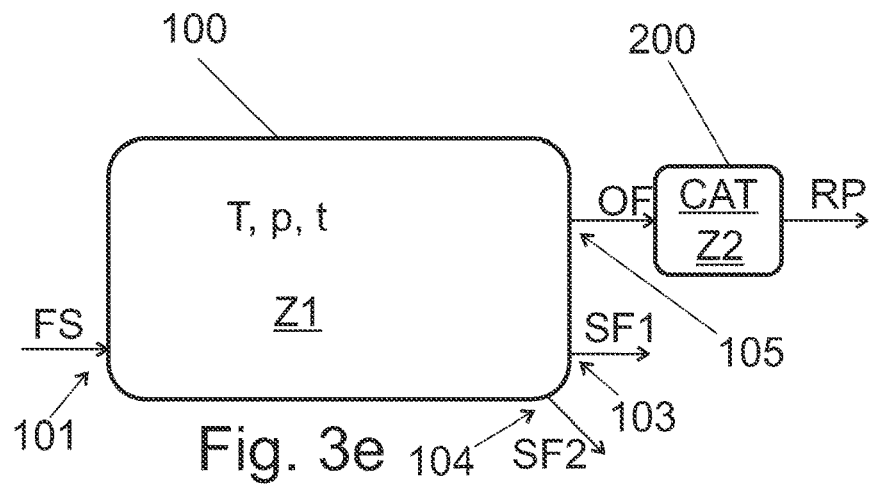

FIG. 3b shows an embodiment, wherein such a solid catalyst CAT is used that addition of hydrogen is necessary. Thus, hydrogen is added into the catalytic reactor 200. Moreover, a catalytic reactor 200, which is separate from the conversion reactor 100 is used for catalytically treating the oil rich fraction OF. Correspondingly, the oil rich fraction is conveyed from the conversion reactor 100 to the catalytic reactor 200.

In the embodiments of FIGS. 3a and 3b, the temperature in the catalytic reactor 200 may be different from the temperature T in the conversion reactor 100. Depending on the catalyst CAT, it may be beneficial that a temperature in the second reaction zone Z2 of the catalytic reactor 200 is higher than a temperature in the first reaction zone Z1 of the conversion reactor 100. In the embodiments of FIGS. 3a and 3b, the pressure in the catalytic reactor 200 may be different from the pressure p in the conversion reactor 100. Having a separate catalytic reactor 200 allows for selecting the solid catalyst CAT reasonably freely.

Figure 3C:
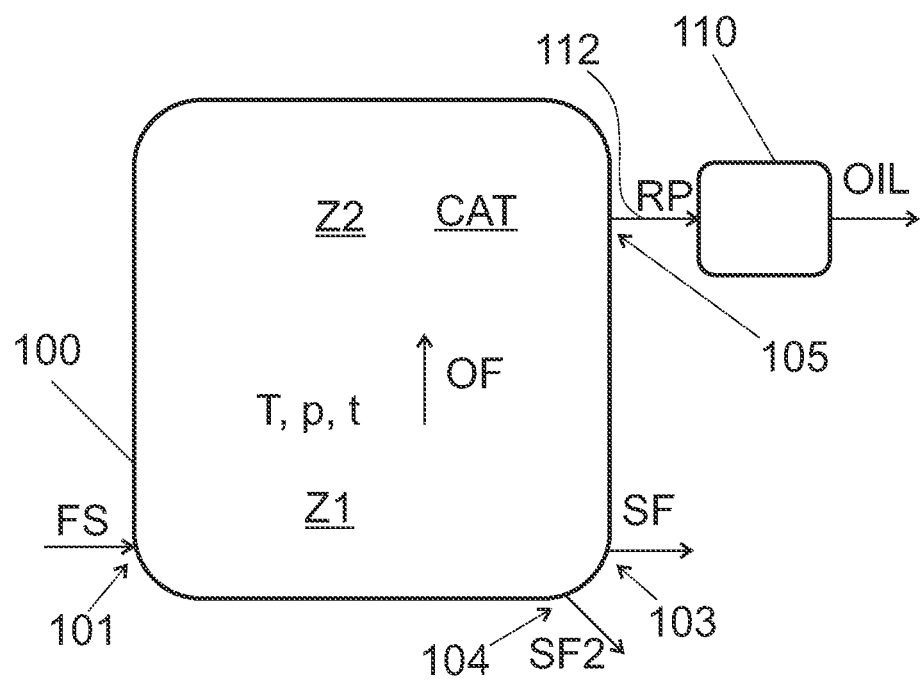

FIG. 3c shows an embodiment, wherein such a solid catalyst CAT is used that addition of hydrogen is not necessary. Moreover, the second process zone Z2 and the solid catalyst CAT are arranged within the conversion reactor 100. Thus, even if the oil rich fraction OF is transferred to the second reaction zone Z2, the oil rich fraction is only transferred within one conversion reactor 100. Thus, the reaction product RP can be withdrawn from the conversion reactor 100.

Figure 3D:
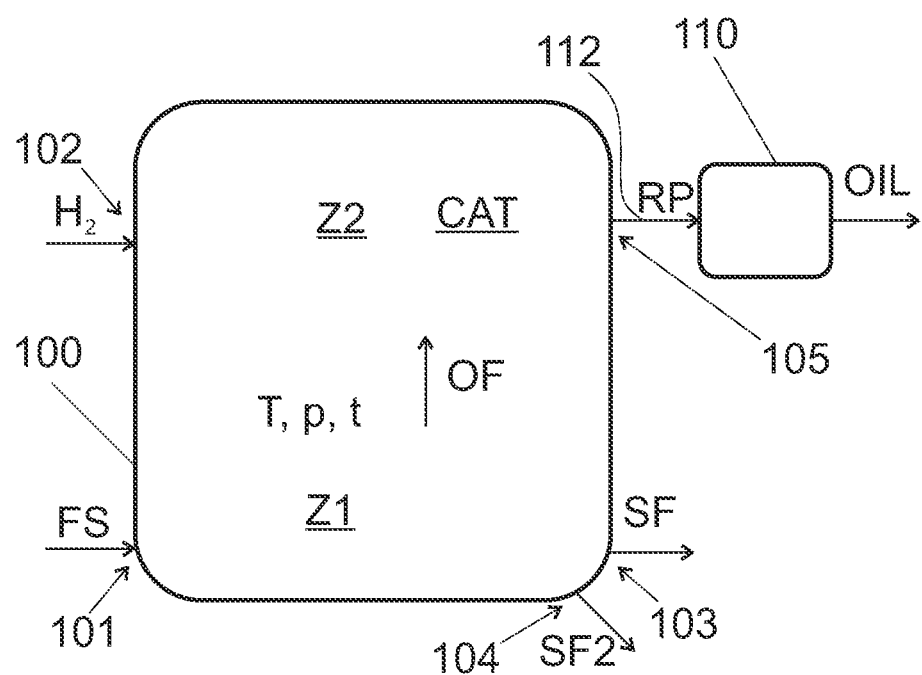

FIG. 3d shows an embodiment, wherein such a solid catalyst CAT is used that addition of hydrogen is necessary. Otherwise this embodiment corresponds to the embodiment of FIG. 3c.

In the embodiments of FIGS. 3c and 3d, the temperature in the second process zone Z2 may be substantially the same as the temperature T in the first reaction zone Z1. In the embodiments of FIGS. 3c and 3d, the pressure in the second process zone Z2 may be substantially the same as the pressure p in the first reaction zone Z1. This may pose some restrictions for the solid catalyst CAT, but allows for use of a simpler system than the embodiments of FIGS. 3a and 3b.

With reference to FIGS. 3b and 3d, some embodiments comprise feeding also hydrogen $H_2$ to the second reaction zone Z2 and allowing the oil rich fraction OF and the hydrogen $H_2$ to react in the second reaction zone Z2. A corresponding system comprises a second inlet 102 for letting in hydrogen into the second process zone Z2. The second inlet 102 may be arranged to the conversion reactor 100 or to the catalytic reactor 200.

The temperature in the second process zone Z2 differs preferably at most 50° C. from the temperature of the first process zone Z1. More preferably, the temperature in the second process zone Z2 differs at most 20° C. from the temperature of the first process zone Z1. However, depending on the catalyst, a temperature difference between the reactors 100 and 200 may be greater.

A residence time within the second process zone Z2 may be e.g. at least 15 minutes, at least 30 minutes, or at least 60 minutes. The residence time is related to the pressure within the second process zone Z2. In general, the higher the pressure, the shorter the residence time. A pressure in the second process zone may be e.g. at least 50 bar, at least 100 bar or at least 120 bar.

As for the term oxygen content, herein the oxygen content of a substance (e.g. oil rich fraction OF, bio oil OIL, primary feedstock FS, or the biomass thereof) refers to the total weight of oxygen atoms in the dry substance in relation to the total weight of the dry substance. The oxygen content is measured in wt % (dry basis). As indicated above, an oxygen content of the (dry) primary feedstock may be in the range from 30 wt % to 45 wt %. In an embodiment, the primary feedstock FS is converted in such a way that an oxygen content of the oil rich fraction OF is at most 20 wt %, preferably at most 15 wt %. Correspondingly, in an embodiment, an oxygen content of the bio oil OIL is at most 20 wt %, preferably at most 15 wt %. Such low oxygen contents seem to be achievable also without using the solid catalyst CAT. In addition to oxygen, the oil rich fraction may comprise sulphur and/or nitrogen.

However, when a solid catalyst CAT is used, the oxygen content of the reaction product RP and/or the bio oil OIL may be even lower because of the deoxygenation reactions. Thus, at least in an embodiment, wherein the solid catalyst CAT is used, an oxygen content of the reaction product RP is at most 10%, preferably at most 5%. Moreover, at least in an embodiment, wherein the solid catalyst CAT is used, an oxygen content of the bio oil OIL is at most 10%, preferably at most 5%. However, depending on the feedstock, the salt, and the process conditions within the first process zone Z1, it may be possible to produce such bio oil OIL that an oxygen content of the bio oil OIL is at most 10%, preferably at most 5%, even if the solid catalyst CAT is not used.

Furthermore, in case the solid catalyst CAT is used, also a nitrogen content may be lowered by the catalytic treatment in the presence of the solid catalyst CAT. In an embodiment, the oil rich fraction OF comprises at least 750 ppm nitrogen. In an embodiment, the oil rich fraction OF comprises from 1000 ppm to 3000 ppm nitrogen. Because of catalytic treatment by the solid catalyst CAT, in an embodiment, the bio oil comprises at least 15% less nitrogen.

Figure 4A:
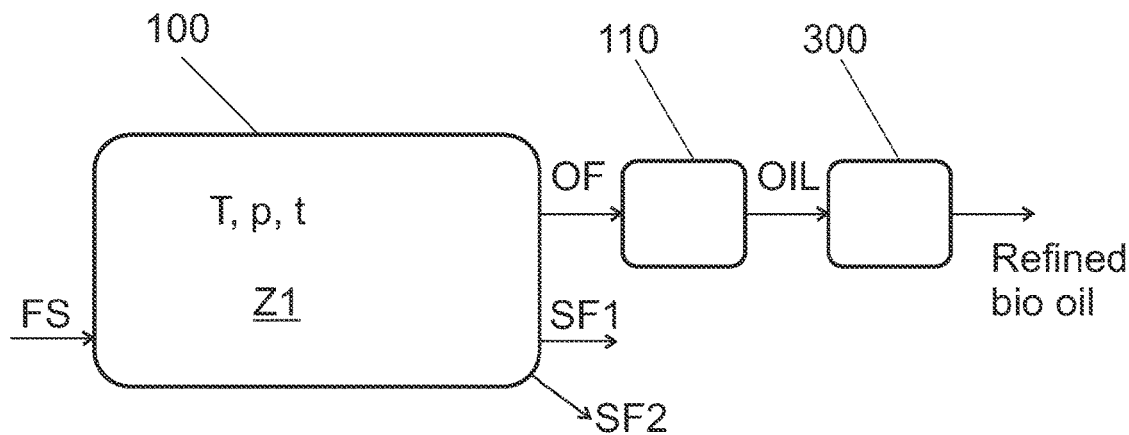
Figure 4B:
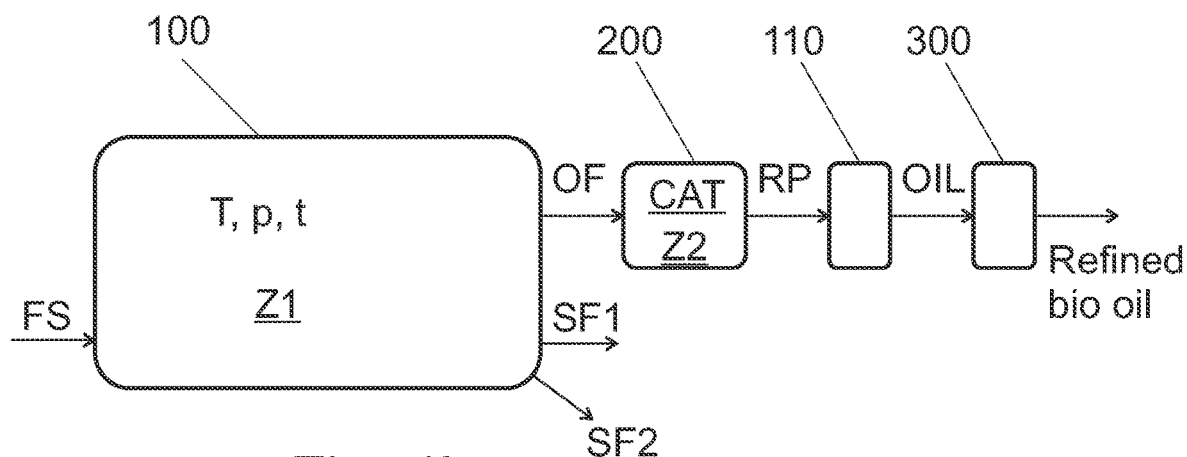
Figure 4C:
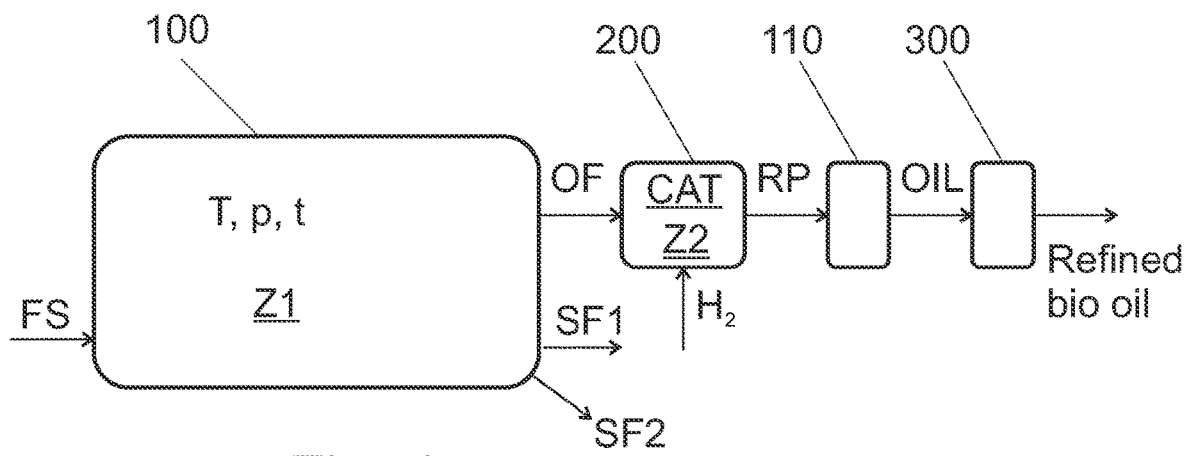

Referring to FIGS. 4a to 4c, the bio oil OIL may be refined. The reference numeral 300 in the Figures indicates refining of the bio oil OIL. Any one of the following bio oils can be refined:
  the bio oil produced without using a solid catalyst CAT (see FIG. 4a),
  the bio oil produced by transforming the oil rich fraction OF to the reaction product RP with such a solid catalyst CAT that functions without addition of hydrogen (see FIG. 4b), and the bio oil produced by transforming the oil rich fraction OF to the reaction product RP with such a solid catalyst CAT that functions with hydrogen (see FIG. 4c).

With reference to FIGS. 3c and 3d, the catalytic reactor 200 can be integrated with the conversion reactor 100, and also such bio oil can be refined (not shown).

As for refining 300, deoxygenation or deoxidation processes can be used to decrease the oxygen content of the bio oil. In addition or alternatively, fractionation, such as distillation, can be performed. Thus, an embodiment comprises refining 300 the bio oil OIL, e.g. by hydrogen deoxidation and/or by hydrodeoxygenation, to produce refined bio oil. An embodiment comprises fractionating the bio oil OIL.

The heating of the primary feedstock FS requires a lot of energy, since the process temperature is high. Therefore, heat is preferably recovered from the process and utilized therein.

Therefore, in an embodiment, the cooler 110 comprises a heat exchanger 115 configured to cool at least one of the oil rich fraction OF and the reaction product RP. Referring to FIGS. 5a to 5f, preferably the heat thus recovered is used to heat the primary feedstock FS. Thus, an embodiment of the method comprises transferring heat from at least one of the oil rich fraction OF and the reaction product RP of the oil rich fraction OF to the primary feedstock FS. Correspondingly, an embodiment of the system comprises a heat exchanger 115 configured to transfer heat from at least one of the oil rich fraction OF and the reaction product RP of the oil rich fraction OF to the primary feedstock FS (or to a part thereof, see FIG. 2 having the heater 130).

The heat exchanger 115 can be seen as the heater 130 discussed above, or as being comprised by the heater 130 discussed above. Thus, the heater 130 of the system may comprise the heat exchanger 115. FIGS. 5a to 5c show heat transfer from the oil rich fraction OF only and a heat exchanger 115 configured to transfer heat from the oil rich fraction OF to the primary feedstock FS.

Figure 5D:
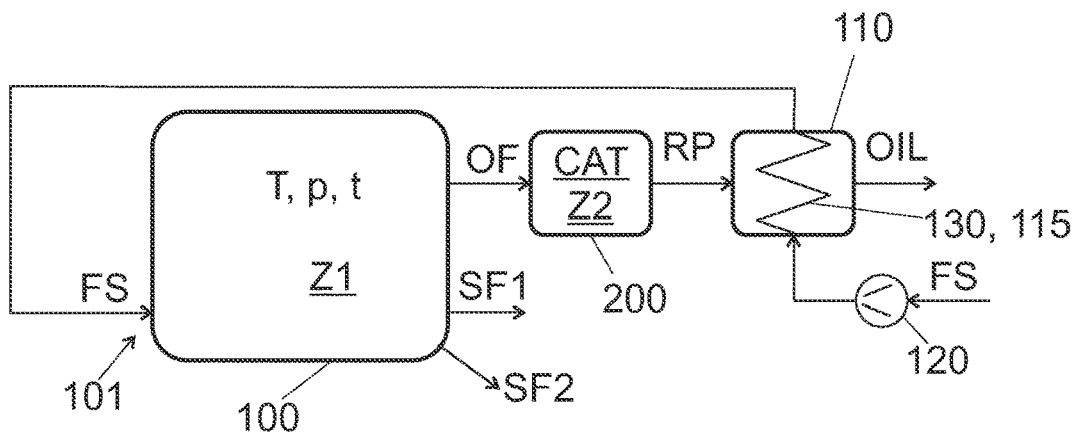
Figure 5E:
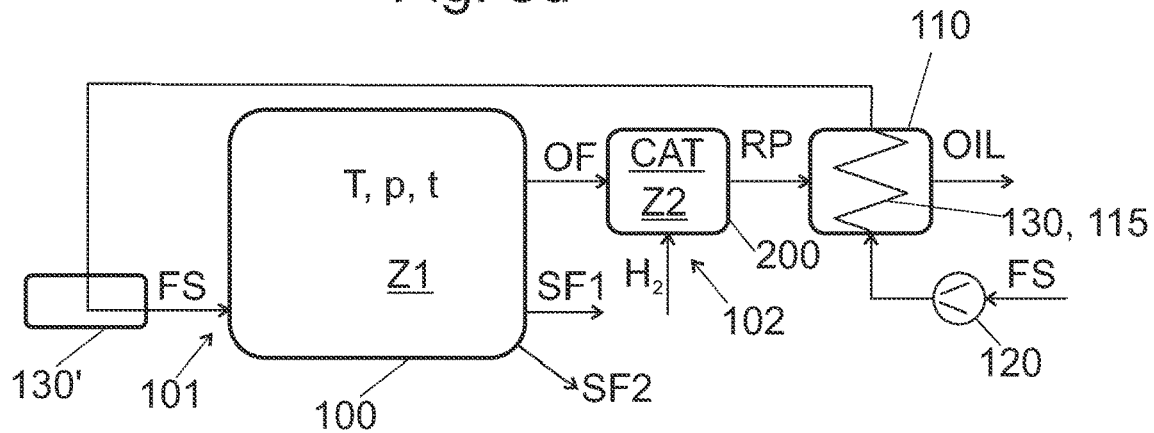
Figure 5F:
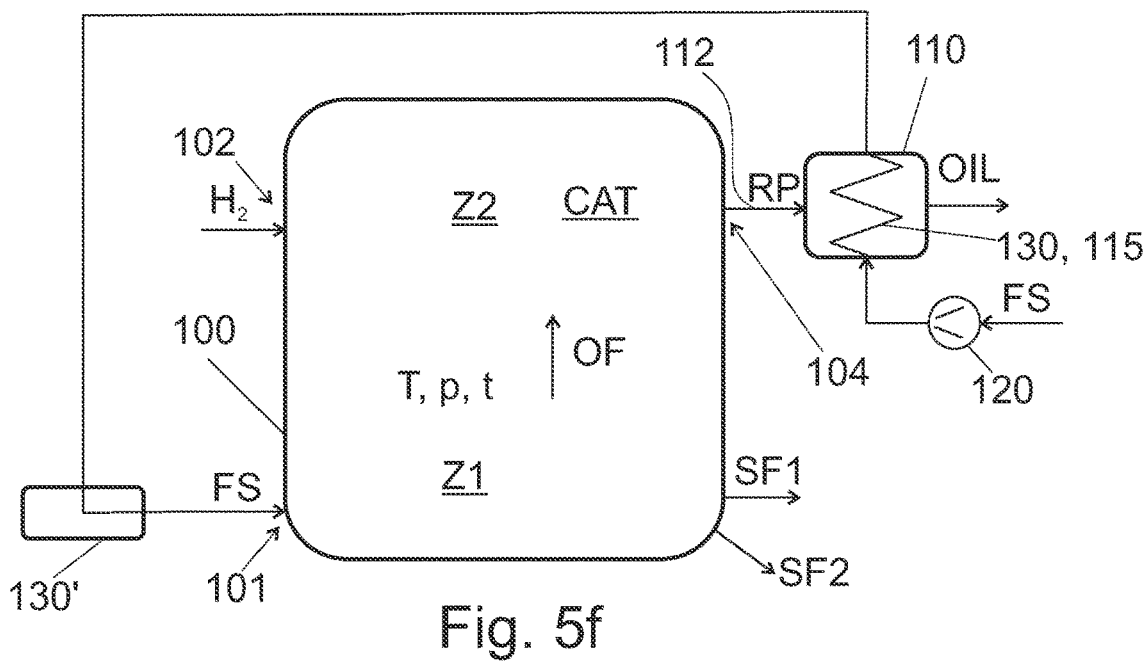

FIGS. 5d to 5f show heat transfer from the reaction product RP of the oil rich fraction OF and a heat exchanger 115 configured to transfer heat from reaction product RP of the oil rich fraction OF to the primary feedstock FS.

Even if such a heat exchanger 115 is used as a heater 130 for the primary feedstock FS, the system may comprise a second heater 130' configured to further heat the primary feedstock FS. Such second heaters 130' are shown in FIGS. 5b, 5c, 5e, and 5f. The cooler 110 may comprise multiple heat exchangers in sequence to improve heat recovery to the primary feedstock FS.

As indicated above, in the method and/or the system, the type two salt is solidified and removed from the conversion reactor 100, whereby it does not clog onto inner walls of the conversion reactor 100. FIGS. 6a, 6b, 6c, and 7 indicate specific means for solidifying the type two salts.

Figure 6A:
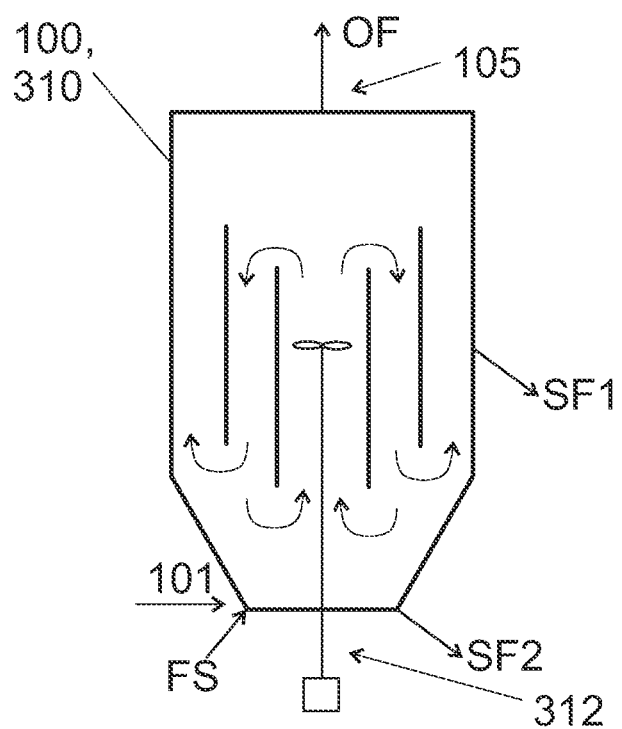
Figure 6B:
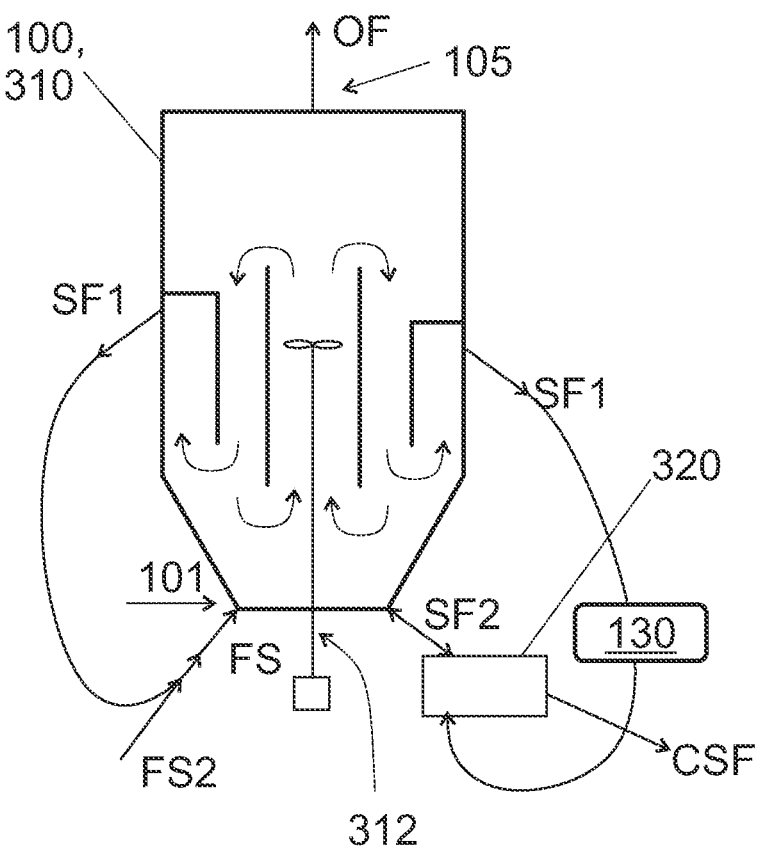
Figure 6C:
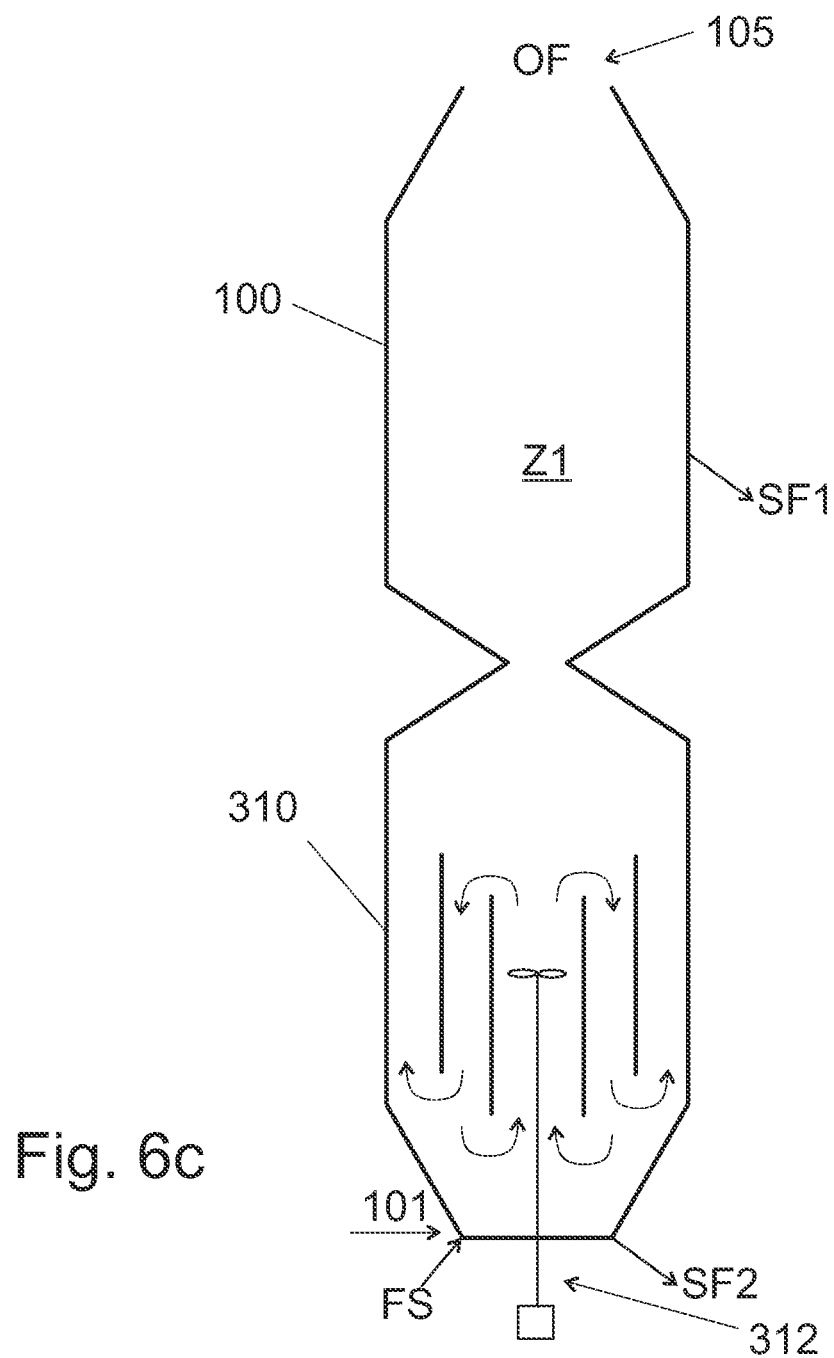

Referring to FIGS. 6a and 6b, the conversion reactor 100 may comprise a crystallizer 310. In general, an internal circulation is provided into the crystallizer. The internal circulation may be provided by a rotor 312, as indicated in FIGS. 6a and 6b. Thus, in these figures, the crystallizer 310 comprises a rotor 312 configured to form an internal circulation in the crystallizer 310. In general, as an alternative to the rotor 312, a pump may be configured to form the internal circulation in the crystallizer 310. Thus, in general, a crystallizer comprises means for forming an internal circulation in the crystallizer 310. Because of the internal circulation, the salt(s) that tend to solidify, crystallize on internal crystallization nuclei of the feedstock FS. Thus, the type two salt(s) do not accumulate on surfaces of the conversion reactor 100. The first and second salt rich fractions SF1 and SF2 may be withdrawn from the crystallizer 310, which forms a part of the conversion reactor 100. In an embodiment, wherein the crystallizer forms only a portion of the conversion reactor 100, the first salt rich fraction SF1 may be withdrawn from the conversion 100 reactor downstream from the crystallizer 310 (see FIG. 6c). However, the first salt rich fraction may, also in such a case, be withdrawn from the crystallizer 310, as in FIGS. 6a and 6b. However, preferably in such an embodiment, at least the second salt rich fraction SF2 is withdrawn from the crystallizer 310 (see FIG. 6c).

Referring in particular to FIG. 6b, when a crystallizer 310 is used, a classifier 320 may also be used. In general, by using a crystallizer 310, precipitates of various size are formed as a result of crystallization. Moreover, because of the internal circulation, the precipitates grow. A classifier 320 can be used to form a classified salt fraction CSF. The classifier 320 is configured to receive the second salt rich fraction SF2. Moreover the classifier 320 is configured to separate from the second salt rich fraction SF2 the classified salt fraction CSF, wherein an average precipitate size of the classified salt fraction CSF is greater than an average precipitate size of the second salt rich fraction SF2. In general, most of precipitates having a particle size above of threshold are allowed to pass the classifier 320 to the classified salt fraction CSF, and most of precipitates having a particle size below of threshold are returned to the crystallizer 310. Thus, the rest of the second salt rich fraction SF2 is returned to the crystallizer in order to allow the precipitates to grow. Typically the classifier operates with another fluid, and the first salt rich fraction SF1 can be used as such operating fluid. Thus, in an embodiment, at least some of the first salt rich fraction SF1 is conveyed to the classifier 320. The first salt rich fraction SF1 is conveyed to the classifier 320 from the conversion reactor 100, which comprises the crystallizer, and optionally, the first salt rich fraction SF1 is conveyed from the crystallizer 310 to the classifier 320. In either case, the heater 130 can be used to heat the first salt rich fraction SF1.

In connection with a crystallizer 310 it is possible to collect both the first and second salt rich fractions SF1 and SF2 to such a part of the conversion reactor 100 that comprises a filter (not shown in the figures). The filter may be e.g. at a lower part of the reactor. The second salt rich fraction SF2 may be separated from the first salt rich fraction SF1 by using the filter. Thereafter, the different fractions SF1, SF2 may be removed from the conversion reactor 100 as discussed above.

In particular, when the feedstock FS comprises black liquor, at least a part of the second salt rich fraction SF2 may be conveyed to a recovery boiler 500 for recovering cooking chemicals.

Referring to FIG. 7 another possibility to solidify the type two salts is to use solid particles 410 as precipitation seeds. Such solid particles 410 may be used in a crystallizer 310 of FIG. 6a to 6c or even if the conversion reactor 100 does not comprise a crystallizer 310. In general, crystallization tends to take place on precipitation seeds. Thus, by providing solid particles 410 into the conversion reactor 100 (optionally to a crystallizer 310 thereof), the type two salts may be solidified onto the solid particles 410. Provided that a density of the crystallized salt is higher than a density of the solid particles 410 without the crystallized salt, the crystallization of the salt increases the density of the particles 410, and the particles 410 tend to fall to a bottom of the conversion reactor 100 (or crystallizer 310) due to gravity.

Moreover, since the solid particles should serve as precipitation seeds, the solid particles 410 should not float within the reactor 100, even when not covered by the salt. Therefore, a density of the solid particles 410 should be roughly the same as a density of the feedstock FS. Thus, in an embodiment, the feedstock within the first reaction zone Z1 has a first density $\rho_1$ (as measured e.g. in kg/m$^3$) and the solid particles 410 have a second density $\rho_2$. Moreover, in an embodiment an absolute value of the difference between the densities relative to the first density (i.e. $|(\rho_2-\rho_1)/\rho_1|$) is at most 25%. Thus, in an embodiment, a density $\rho_2$ of the solid particles 410 deviates from a density pi of the materials in the first reaction zone Z1 by at most 25%. More preferably, the second density $\rho_2$ is equal to or slightly (e.g. at most 10%) less than the first density pi. Thus, a relative difference $(\rho_1-\rho_2)/\rho_1$ may be from 0 to 10%. In a typical conversion process, the density of the feedstock in the first reaction zone Z1 is around 400 kg/m$^3$. Moreover, typically all solidified salts have a density that is higher than this. Therefore, in an embodiment, a density of the solid particles, when not covered with solidified salt, is from 200 kg/m$^3$ to 800 kg/m$^3$. In particular, if a crystallizer 310 is used, the internal circulation may provide for sufficient mixing of the feedstock and the solid particles, even if a difference between the densities is large.

Referring to FIG. 7, when the salt solidifies onto the solid particles 410, the solid particles gain weight, whereby their density increases. Thus, the covered solid particles fall downwards, and may be withdrawn from a lower part of the conversion reactor 100 (e.g. from a crystallizer thereof). Thus, the second outlet 104 is arranged at a lower part (e.g. at a bottom) of the conversion reactor. This is shown schematically in FIG. 7. Moreover, the second salt rich fraction SF2 comprises solidified second salt, which is in the form of shells of the solid particles 410.

The solid particles 410, covered by solidified salt, may be conveyed to a vessel 420. It may be economically feasible to re-use the solid particles 410. Thus, in an embodiment, some of the solid particles 410, covered by solidified salt, are washed in the vessel 420. Water may be used as the washing solution. Water may be added to the vessel 420. However, the water of the second salt rich fraction SF2 may be sufficient for dissolving the salt, provided that the temperature is lowered to sub-critical conditions. As indicated above, the solidifying of the salt is mainly due to supercritical conditions within the first process zone Z1. Thus, by adjusting the conditions to sub-critical, the salt may dissolve to the water of the second salt rich fraction SF2. As the salt dissolve to the washing solution or to the water of the second salt rich fraction SF2, the solid particles 410 become clean from the salt, whereby their density decreases. Thus, the washed particles can be recirculated into the conversion reactor 100, as indicated in FIG. 7 by the arrow 422 "washed particles". Thus the system comprises a line 422 configured to convey washed solid particles 410 from the vessel 420 to the conversion reactor 100. The solution that is withdrawn from the vessel 420 comprises second salt in dissolved form. At least when the feedstock FS comprises black liquor, the solution that is withdrawn from the vessel 420 may be conveyed to a recovery boiler 500 or to an evaporator arranged upstream from the recovery boiler 500. Typically black liquor is concentrated in such evaporators.

In the embodiment of FIG. 7, it is possibly to convey both the first and second salt rich fractions to the vessel 420, which then can be seen as part of the reactor 100. The vessel 420 may be provided with a filter to separate the particles 410 having the solidified second salt (i.e. the second salt rich fraction SF2) from the brine (i.e. the first salt rich fraction SF1). These fractions may be removed from the vessel 420 through different outlets (not shown in the figures).

Preferably, hollow or porous metal particles are used as the solid particles 410. Metals typically can withstand the high temperatures and pressures of the first process zone Z1. However, some metals have too low melting point in view of the supercritical conditions. Thus, the metals particles may be made of metal or metal ally that has a melting point of at least 400° C. Moreover, a density of many metals is too high in view of what has been said about the density of the solid particles 410. However, hollow particles have a smaller density. By properly selecting the size and the wall thickness of the hollow metal particles or the porosity of the metal particles, one can make solid particles 410 that can withstand the process environment of the first process zone Z1 and has to aforementioned density.

REFERENCE

[1] Thomas Voisin, Arnaud Erriguible, David Ballenghien, David Mateos, André Kunegel, et al. Solubility of inorganic salts in sub- and supercritical hydrothermal environment: Application to SCWO processes. Journal of Supercritical Fluids, Elsevier, 2017, 120, Part 1, pp. 18-31. 10.1016/j.supflu.2016.09.020. hal-01417006

The invention claimed is:

1. A method for producing an oil rich fraction from biomass, the method comprising the steps of:
    providing primary feedstock that comprises water, first salt, second salt, and biomass to a first reaction zone of a conversion reactor,
    allowing the primary feedstock to react in the first reaction zone at a temperature of at least 350° C. in a pressure of at least 160 bar to form converted primary feedstock,
    separating at the temperature of at least 350° C. and in the pressure of at least 160 bar from the converted primary feedstock a first salt rich fraction, a second salt rich fraction, and an oil rich fraction,
    withdrawing the oil rich fraction from the first reaction zone,
    withdrawing the first salt rich fraction and the second salt rich fraction from the conversion reactor,
    cooling at least one of the oil rich fraction and a reaction product of the oil rich fraction to produce liquid bio oil,
    recovering heat from the oil rich fraction or a reaction product thereof to produce the liquid bio-oil, and
    heating at least a part of the primary feedstock with the recovered heat,
    wherein:
        the first salt rich fraction comprises at least some of the first salt dissolved in the water,
        the second salt rich fraction comprises at least some of the second salt in solid form, and
        at least one of the first salt and the second salt is a salt capable of catalysing the reaction of the biomass of the primary feedstock with the water of the primary feedstock to produce the oil rich fraction.

2. The method of claim 1, further comprising the step of recycling salt or salts for use as a catalyst and/or for recovering materials therefrom.

3. The method of claim 1, further comprising the step of feeding at least some of the first salt rich fraction and/or at least some of the second salt rich fraction into the first reaction zone of the conversion reactor.

4. The method of claim 3, wherein at least some of the first salt rich fraction is fed into the first reaction zone of the conversion reactor.

5. The method of claim 1, wherein the primary feedstock comprises black liquor and the method further comprises feeding at least some of the first salt rich fraction and/or at least some of the second salt rich fraction into chemical recovery cycle configured to recover cooking chemicals.

6. The method of claim 5, wherein at least some of the second salt rich fraction is fed into the chemical recover cycle.

7. The method of claim 1, wherein at least one of the first salt and the second salt is a salt of a metal having a standard electrode potential at the temperature 298 K of at most −0.5 V.

8. The method of claim 7, wherein the first salt is a salt of potassium (K) or sodium (Na).

9. The method of claim 1, wherein a total content of the first and second salts of the primary feedstock is at least 1 wt %.

10. The method of claim 1, wherein an oxygen content of the bio-oil is at most 20%.

11. The method of claim 1, wherein an oxygen content of the oil rich fraction is at most 20 wt %.

12. The method of claim 1, further comprising the step of allowing the primary feedstock to react in the first reaction zone at a temperature from 350° C. to 450° C. in a pressure of from 220 bar to 350 bar for at least 5 minutes.

13. The method of claim 1, further comprising the step of crystallizing at least a part of the second salt in a crystallizer to from crystallized second salt.

14. The method of claim 1, further comprising the step of crystallizing at least a part of the second salt onto solid particles.

15. The method of claim 1, further comprising the steps of:
transferring the oil rich fraction to a second reaction zone, and
allowing the oil rich fraction to react in the presence of a solid catalyst in the second reaction zone to produce the reaction product.

16. The method of claim 1, further comprising the step of separating at least one of a non-condensable gas and a water rich fraction from the condensate of the oil rich fraction or the reaction product thereof to produce the liquid bio-oil.

17. A method for producing an oil rich fraction from biomass, the method comprising the steps of:
providing primary feedstock that comprises water, first salt, second salt, and biomass to a first reaction zone of a conversion reactor,
allowing the primary feedstock to react in the first reaction zone at a temperature of at least 350° C. in a pressure of at least 160 bar to form converted primary feedstock,
separating at the temperature of at least 350° C. and in the pressure of at least 160 bar from the converted primary feedstock a first salt rich fraction, a second salt rich fraction, and an oil rich fraction,
withdrawing the oil rich fraction from the first reaction zone, and
withdrawing the first salt rich fraction and the second salt rich fraction from the conversion reactor,
wherein:
the first salt rich fraction comprises at least some of the first salt dissolved in the water,
the second salt rich fraction comprises at least some of the second salt in solid form,
at least one of the first salt and the second salt is a salt capable of catalysing the reaction of the biomass of the primary feedstock with the water of the primary feedstock to produce the oil rich fraction; and
[A] the method comprises feeding at least some of the first salt rich fraction and/or at least some of the second salt rich fraction into the first reaction zone of the conversion reactor, and/or
[B] the primary feedstock comprises black liquor and the method comprises feeding at least some of the first salt rich fraction and/or at least some of the second salt rich fraction into chemical recovery cycle configured to recover cooking chemicals.

18. A method for producing an oil rich fraction from biomass, the method comprising the steps of:
providing primary feedstock that comprises water, first salt, second salt, and biomass to a first reaction zone of a conversion reactor,
allowing the primary feedstock to react in the first reaction zone at a temperature of at least 350° C. in a pressure of at least 160 bar to form converted primary feedstock,
separating at the temperature of at least 350° C. and in the pressure of at least 160 bar from the converted primary feedstock a first salt rich fraction, a second salt rich fraction, and an oil rich fraction,
withdrawing the oil rich fraction from the first reaction zone,
withdrawing the first salt rich fraction and the second salt rich fraction from the conversion reactor, and
cooling at least one of the oil rich fraction and a reaction product of the oil rich fraction to produce liquid bio oil,
wherein:
an oxygen content of the bio-oil is at most 20%,
the first salt rich fraction comprises at least some of the first salt dissolved in the water,
the second salt rich fraction comprises at least some of the second salt in solid form, and
at least one of the first salt and the second salt is a salt capable of catalysing the reaction of the biomass of the primary feedstock with the water of the primary feedstock to produce the oil rich fraction.

19. A method for producing an oil rich fraction from biomass, the method comprising the steps of:
providing primary feedstock that comprises water, first salt, second salt, and biomass to a first reaction zone of a conversion reactor,
allowing the primary feedstock to react in the first reaction zone at a temperature of at least 350° C. in a pressure of at least 160 bar to form converted primary feedstock,
separating at the temperature of at least 350° C. and in the pressure of at least 160 bar from the converted primary feedstock a first salt rich fraction, a second salt rich fraction, and an oil rich fraction,
withdrawing the oil rich fraction from the first reaction zone,
withdrawing the first salt rich fraction and the second salt rich fraction from the conversion reactor, and
allowing the primary feedstock to react in the first reaction zone at a temperature from 350° C. to 450° C. in a pressure of from 220 bar to 350 bar for at least 5 minutes, wherein:
the first salt rich fraction comprises at least some of the first salt dissolved in the water,
the second salt rich fraction comprises at least some of the second salt in solid form, and
at least one of the first salt and the second salt is a salt capable of catalysing the reaction of the biomass of the primary feedstock with the water of the primary feedstock to produce the oil rich fraction.

* * * * *

UNITED STATES PATENT AND TRADEMARK OFFICE
CERTIFICATE OF CORRECTION

PATENT NO. : 12,123,137 B2
APPLICATION NO. : 17/754850
DATED : October 22, 2024
INVENTOR(S) : Tero Joronen Page 1 of 1

It is certified that error appears in the above-identified patent and that said Letters Patent is hereby corrected as shown below:

In the Claims

In Column 19, Line 12, Claim 6, delete "chemical recover" and insert -- chemical recovery --, therefor.

Signed and Sealed this
Twenty-eighth Day of January, 2025

Coke Morgan Stewart
*Acting Director of the United States Patent and Trademark Office*